(12) United States Patent
Osterfeld et al.

(10) Patent No.: US 7,255,760 B2
(45) Date of Patent: Aug. 14, 2007

(54) APPARATUS FOR MANUFACTURING FILTER CARTRIDGES, AND METHOD OF USING SAME

(75) Inventors: Gary J. Osterfeld, Saint Henry, OH (US); Gary G. Parent, Greenville, OH (US)

(73) Assignee: Honeywell International, Inc., Morristown, NJ (US)

( * ) Notice: Subject to any disclaimer, the term of this patent is extended or adjusted under 35 U.S.C. 154(b) by 465 days.

(21) Appl. No.: 10/979,618

(22) Filed: Nov. 1, 2004

(65) Prior Publication Data

US 2005/0061618 A1 Mar. 24, 2005

Related U.S. Application Data

(63) Continuation of application No. 10/037,608, filed on Nov. 7, 2001, now Pat. No. 6,817,466.

(60) Provisional application No. 60/247,450, filed on Nov. 9, 2000.

(51) Int. Cl.
*B01D 27/00* (2006.01)
*B32B 37/00* (2006.01)
(52) U.S. Cl. .................... 156/69; 156/556; 156/566
(58) Field of Classification Search .................. 156/69, 156/293, 556, 566, 569
See application file for complete search history.

(56) References Cited

U.S. PATENT DOCUMENTS 1,433,251 A 10/1922 Annen
1,906,604 A 5/1933 Hutchinson
2,415,997 A 2/1947 Eldred
2,739,916 A 3/1956 Parker
2,815,895 A 12/1957 Reed
3,069,035 A 12/1962 Schwarz et al.

(Continued)

FOREIGN PATENT DOCUMENTS

EP 0260674 B1 6/1992

(Continued)

OTHER PUBLICATIONS

International Search Report for PCT/US01/46755, dated Mar. 11, 2002.

(Continued)

*Primary Examiner*—Jeff H. Aftergut

(57) ABSTRACT

An apparatus for placing an end cap on a cylindrical workpiece includes a stationary support base, a guide member, a push bar, and an applicator device. The guide member is affixed to the stationary support base, and includes a ramp, disposed at an angle to the horizontal. The push bar is slidably movable in relation to the support base. The applicator includes a back plate which is operatively pivotally attached to the push bar at a pivot connection. The lower part of the applicator has a post attached thereto, which rides along the ramp of the guide member. Linear inward movement of the push bar, from a first position to a second position thereof, moves the applicator post up the ramp of the guide member, pivoting the applicator around the pivot connection, and causing the back plate to move from a substantially horizontal orientation to a substantially vertical orientation thereof. The applicator further includes a clamping jig having a plurality of curved segments, for grasping a circular end cap therebetween.

18 Claims, 18 Drawing Sheets

U.S. PATENT DOCUMENTS

| | | |
|---|---|---|
| 3,133,847 A | 5/1964 | Millington |
| 3,164,506 A | 1/1965 | Lake |
| 3,238,699 A | 3/1966 | Morton |
| 3,265,035 A | 8/1966 | Rosenstein et al. |
| 3,303,794 A | 2/1967 | Humbert, Jr. |
| 3,330,400 A | 7/1967 | Alexander |
| 3,354,012 A * | 11/1967 | Forman et al. ............... 156/69 |
| 3,517,477 A | 6/1970 | Thornton |
| 3,948,712 A | 4/1976 | Stannard |
| 3,967,847 A | 7/1976 | Ellis |
| 3,981,673 A | 9/1976 | Sokolow |
| 4,569,628 A | 2/1986 | Berecz |
| 4,626,307 A | 12/1986 | Cherkas et al. |
| 4,650,234 A | 3/1987 | Blatt |
| 4,651,879 A | 3/1987 | Harris et al. |
| 4,744,596 A | 5/1988 | Hiller et al. |
| 4,747,816 A | 5/1988 | Matsuyama et al. |
| 4,795,524 A | 1/1989 | Sakaida et al. |
| 4,802,816 A | 2/1989 | Mezhinsky |
| 4,811,834 A | 3/1989 | Asano et al. |
| 4,915,210 A | 4/1990 | Jowitt et al. |
| 5,028,330 A | 7/1991 | Caronia et al. |
| 5,036,631 A | 8/1991 | Stoltz |
| 5,145,388 A | 9/1992 | Brownlie et al. |
| 5,248,211 A | 9/1993 | Holst |
| 5,481,794 A | 1/1996 | Fischer et al. |
| 5,571,560 A | 11/1996 | Lin |
| 5,607,045 A | 3/1997 | Hermann Kronsedar |
| 5,698,059 A | 12/1997 | Bilski et al. |
| 5,927,473 A | 7/1999 | Draghetti |
| 5,941,322 A | 8/1999 | Stephenson et al. |
| 6,032,714 A | 3/2000 | Fenton |
| 6,042,166 A | 3/2000 | Conte |
| 6,048,013 A | 4/2000 | Moilanen et al. |
| 6,096,212 A | 8/2000 | Quick et al. |
| RE37,450 E | 11/2001 | Deken et al. |
| 6,354,427 B1 | 3/2002 | Pickel et al. |
| RE37,975 E | 2/2003 | Stephenson et al. |
| 6,691,860 B2 | 2/2004 | Osterfeld et al. |

FOREIGN PATENT DOCUMENTS

| | | |
|---|---|---|
| EP | 0619166 A1 | 10/1994 |
| EP | 0577569 B1 | 4/1996 |
| FR | 2416041 | 8/1979 |
| GB | 2272843 A | 6/1994 |
| JP | 11-162808 | 6/1999 |
| WO | WO 86/05443 | 9/1986 |
| WO | WO 02/38242 A2 | 5/2002 |
| WO | WO 02/38475 | 5/2002 |

OTHER PUBLICATIONS

International Search Report for PCT/US01/46756, dated Jun. 10, 2002.

International Search Report for PCT/US01/46757, dated Mar. 1, 2002.

International Search Report for PCT/US01/48109, dated Jun. 21, 2002.

U.S. Appl. No. 10/037,596, filed Nov. 7, 2001 entitled Method and Apparatus for Fixing the Position of an End Cap on a Filter Element, Using Inductive Heating.

U.S. Appl. No. 10/037,565, filed Nov. 7, 2001 entitled Material Dispensing Apparatus Including A Nozzle Having A Wedge-Shaped Aperture, And Method Of Using Same.

* cited by examiner

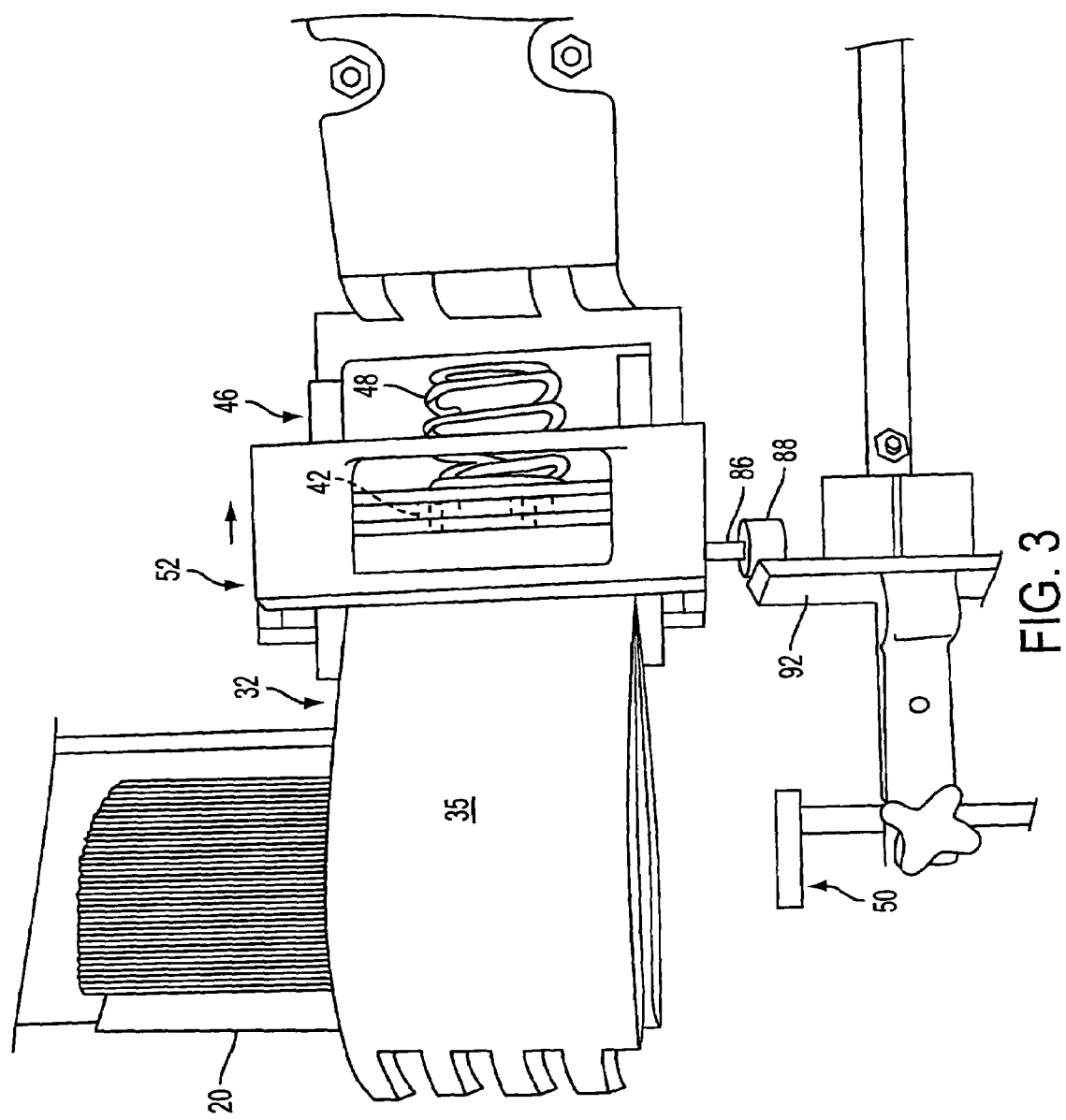

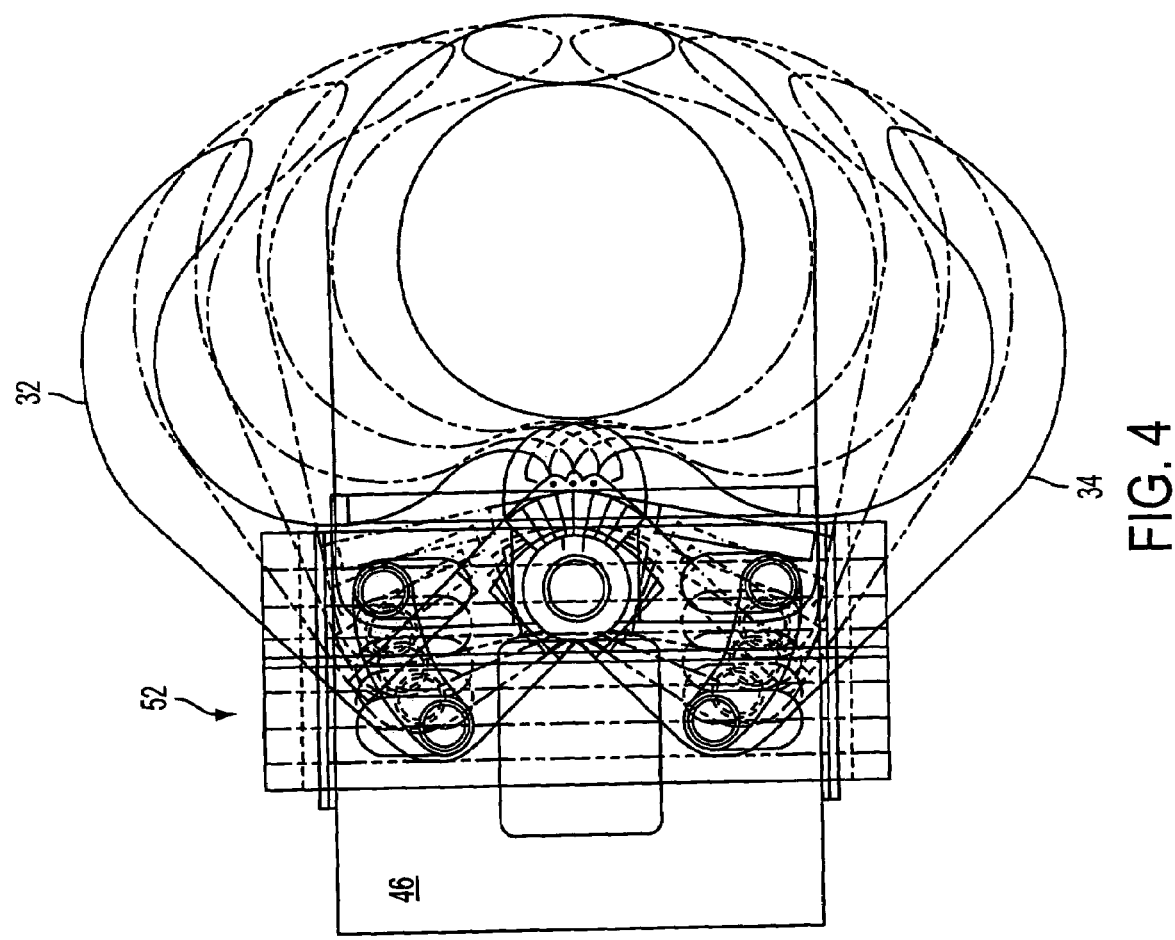

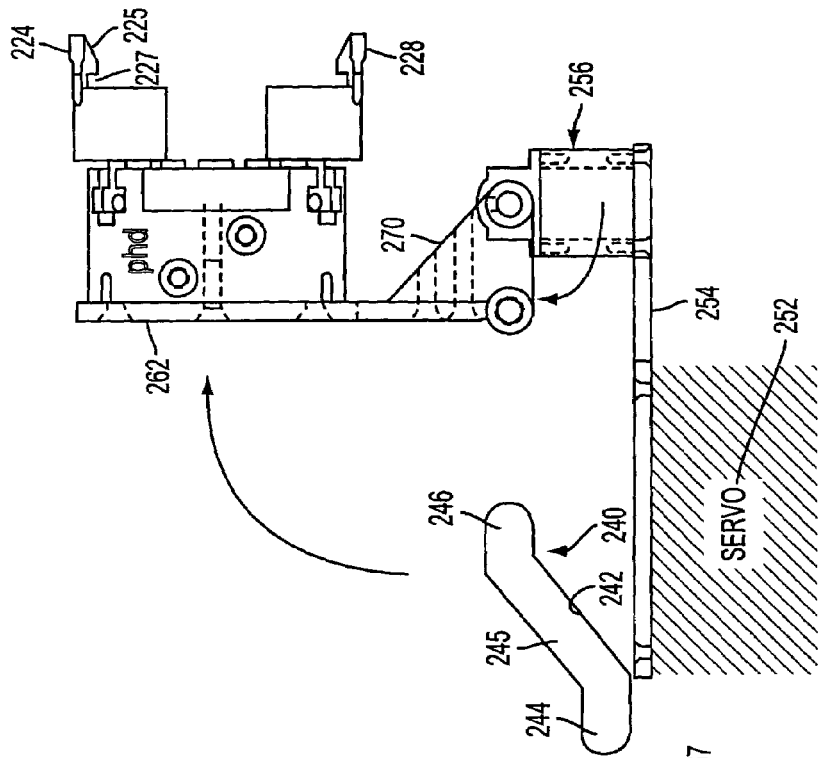
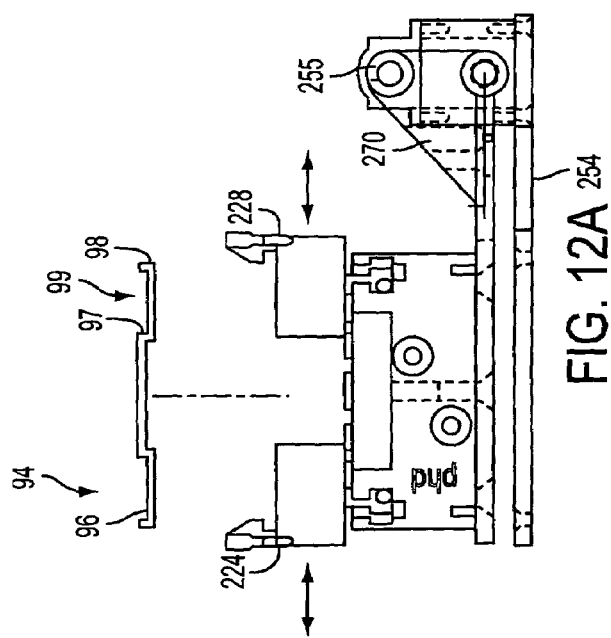
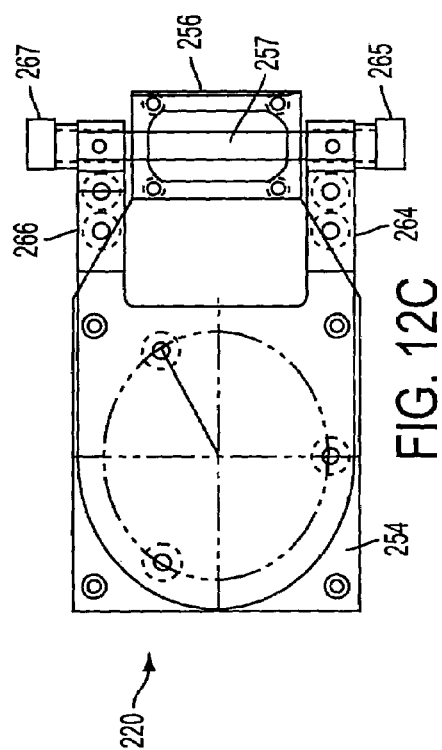
FIG. 12B
FIG. 12A
FIG. 12C

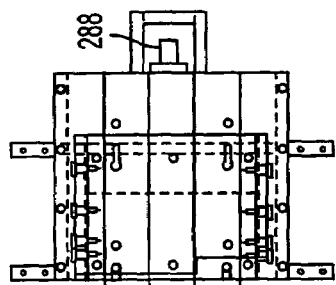
FIG. 14B
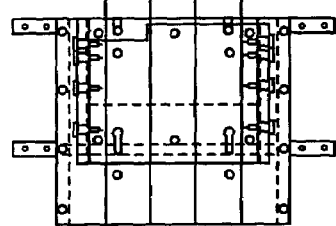
FIG. 14C
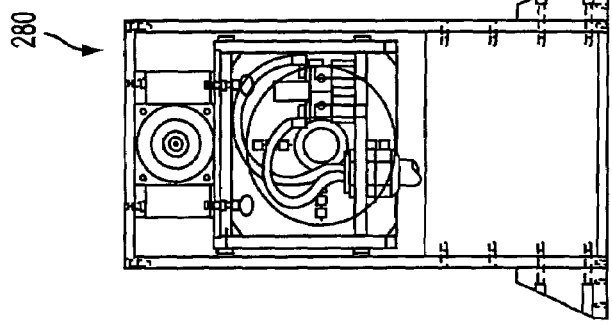
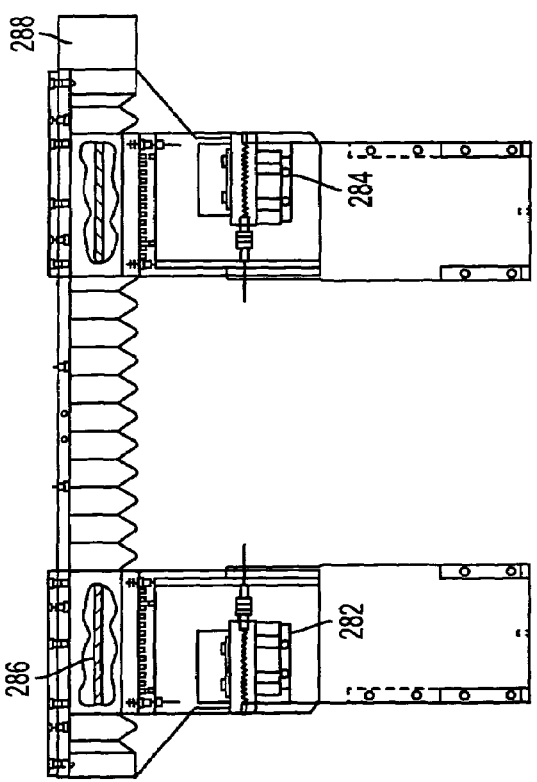
FIG. 14A

APPARATUS FOR MANUFACTURING FILTER CARTRIDGES, AND METHOD OF USING SAME

CROSS REFERENCE TO RELATED APPLICATIONS

This application is a Continuation of U.S. patent application Ser. No. 10/037,608, filed Nov. 7, 2001, now U.S. Pat. No. 6,817,466, which claims the benefit of U.S. provisional application Ser. No. 60/247,450, filed Nov. 9, 2000, the contents of which are incorporated herein by reference thereto.

This application is also related to U.S. patent application Ser. No. 10/037,596, filed Nov. 7, 2001, now U.S. Pat. No. 6,852,184, U.S. patent application Ser. No. 10/037,565, now U.S. Pat. No. 6,799,736, and U.S. Pat. No. 6,691,860, issued Feb. 17, 2004, the contents of which are incorporated herein by reference thereto.

BACKGROUND OF THE INVENTION

1. Field of the Invention

The present invention relates to an apparatus for manufacturing filter cartridges for use in filtering fluids. More particularly, the present invention relates to a method and apparatus as described, in which two end caps are simultaneously and precisely placed on opposed ends of a filter element, using an automated apparatus.

2. Description of the Background Art

Many devices are known for use in material handling. Examples of some known material handling devices include U.S. Pat. Nos. 4,569,628, 4,650,234, 4,802,816, 4,811,834, 5,481,794, and 5,145,388.

Certain filter-forming machinery is sold by Midmac Systems, Inc. of Saint Paul, Minn., and is shown and advertised on the Internet at http://www.midmac.com/FilterTech.htm.

Examples of some known patents relating to filter manufacture include U.S. Pat. Nos. 2,739,916, 3,164,506, 3,306,794, 3,948,712, 4,626,307, 4,747,816, 5,028,330, and 5,698,059.

SUMMARY OF THE INVENTION

The present invention provides an apparatus for placing an end cap on a cylindrical workpiece, including a stationary support base, a guide member, a push bar, and an emplacement applicator.

The guide member is attached in fixed relation to the stationary support base, and is provided to guide movement of the emplacement applicator. The guide member has a guide groove formed therein, in which the guide groove defines a ramp.

The push bar is provided to push the emplacement applicator forward in relation to the support base, and is slidably movable thereon.

The emplacement applicator includes a back plate, and the back plate has a lower end which is operatively pivotally attached to the push bar, at a pivot connection. A lower part of the back plate has a triangular flange thereon, which is substantially transverse to the back plate. The triangular flange has a post attached thereto, which is spaced away from the pivot connection, and the post rides in the guide groove of the guide member. Preferably, the post has a bearing thereon, to facilitate sliding movement thereof along the ramp. When the push bar moves the emplacement applicator forward, the post moves up the ramp of the guide member.

The emplacement applicator further includes a clamping jig, having a plurality of adjustably movable arcuate segments which cooperate to define a circular hollow space therebetween. Each of the segments of the clamping jig is radially and reciprocally movable away from, and towards the center of the circular hollow space defined by the segments.

Linear inward movement of the push bar, from a first position to a second position thereof, forces the emplacement applicator to move with the push bar because of the pivotal connection therebetween. Thus, inward movement of the push bar moves the emplacement applicator post up the ramp of the guide member, thereby pivotally moving the emplacement applicator around the pivot connection. This movement causes the emplacement applicator to move from a substantially horizontal orientation to a substantially vertical orientation thereof, and where the emplacement applicator clamping jig has an end cap therein, moves the end cap in the same way.

Preferably, the apparatus of the invention includes a pair of substantially identical first and second end cap applicators of the type described, oriented facing toward one another in a mirror image arrangement. The inclusion of dual applicators allows the apparatus to simultaneously place two end caps on opposite ends of a substantially cylindrical filter element.

In this preferred arrangement, the opposed push bars may be simultaneously activated, and moved in opposite directions, by dual electronically synchronized servo motors which are operated by a computerized controller. The servo motors move the opposed push bars in opposite directions from one another.

For a more complete understanding of the present invention, the reader is referred to the following detailed description section, which should be read in conjunction with the accompanying drawings. Throughout the following detailed description and in the drawings, like numbers refer to like parts.

BRIEF DESCRIPTION OF THE DRAWINGS

FIG. 3 is a birds-eye perspective view of the handling and transfer station of FIG. 2;

FIG. 4 is a simplified side view of part of a gripper apparatus, which is a component shown in FIGS. 2-3, showing a juxtaposed progressive time-lapse sequence of positions of the opposed jaws thereof, during full travel from open to closed;

FIG. 12A is a side plan view of an emplacement applicator assembly which is part of the end cap application station of FIG. 7, showing the orientation thereof at a first time;

FIG. 12B is a side plan view similar to FIG. 12A, showing the orientation of the emplacement applicator at a second time, subsequent to that of FIG. 12A;

FIG. 12C is a bottom plan view of the emplacement applicator assembly of FIGS. 12A-12B;

FIG. 14A is a side plan view of an end cap pre-cure station which is another portion of the assembly line of FIG. 1;

FIG. 14B is a top plan view of the end cap pre-cure station of FIG. 14A;

FIG. 14C is an inner end plan view of the end cap pre-cure station of FIG. 14A;

DETAILED DESCRIPTION OF THE PREFERRED EMBODIMENT

Figure 1:
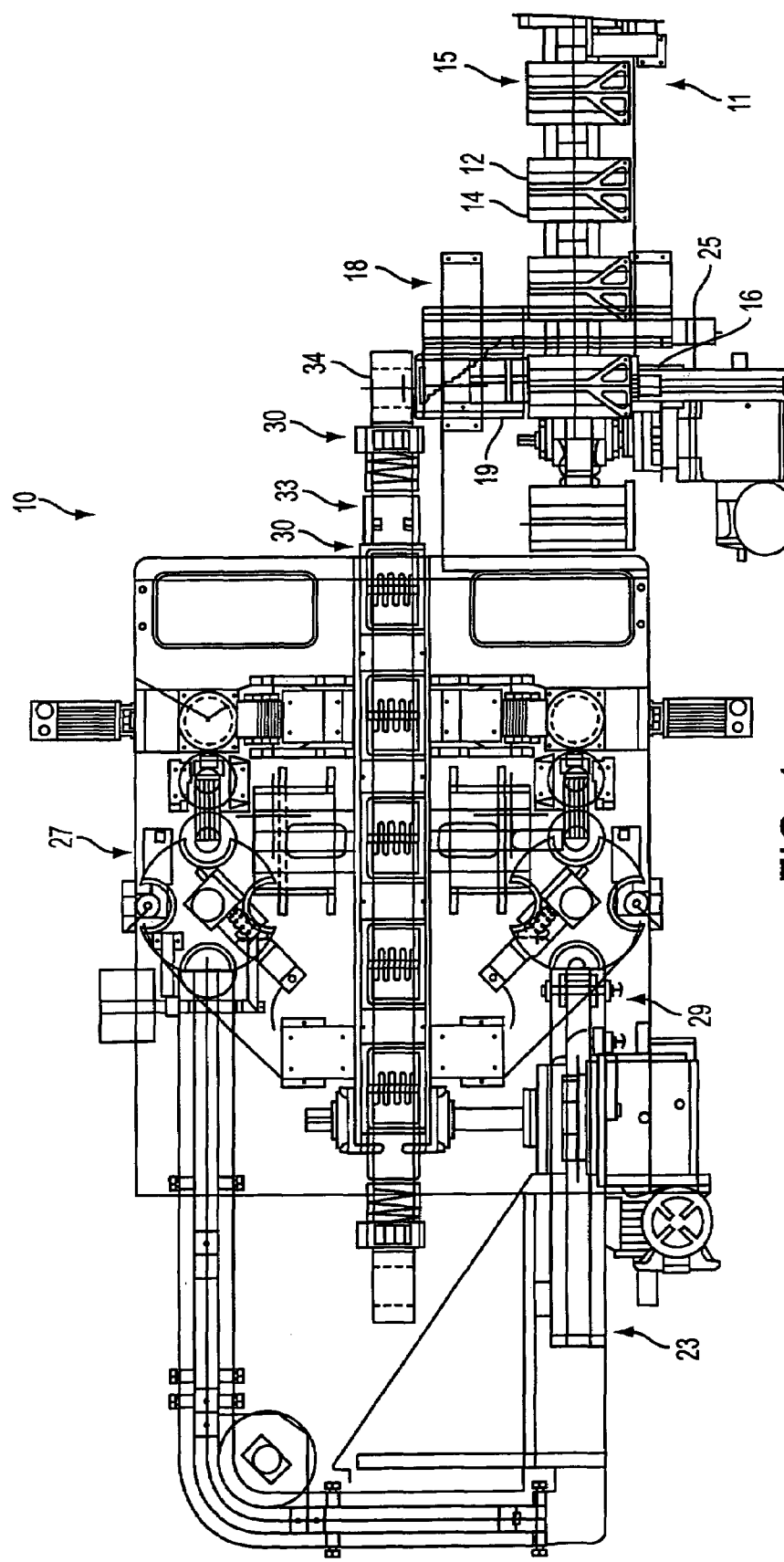
FIG. 1 is a simplified top plan view of an assembly line according to the present invention.
Figure 8:
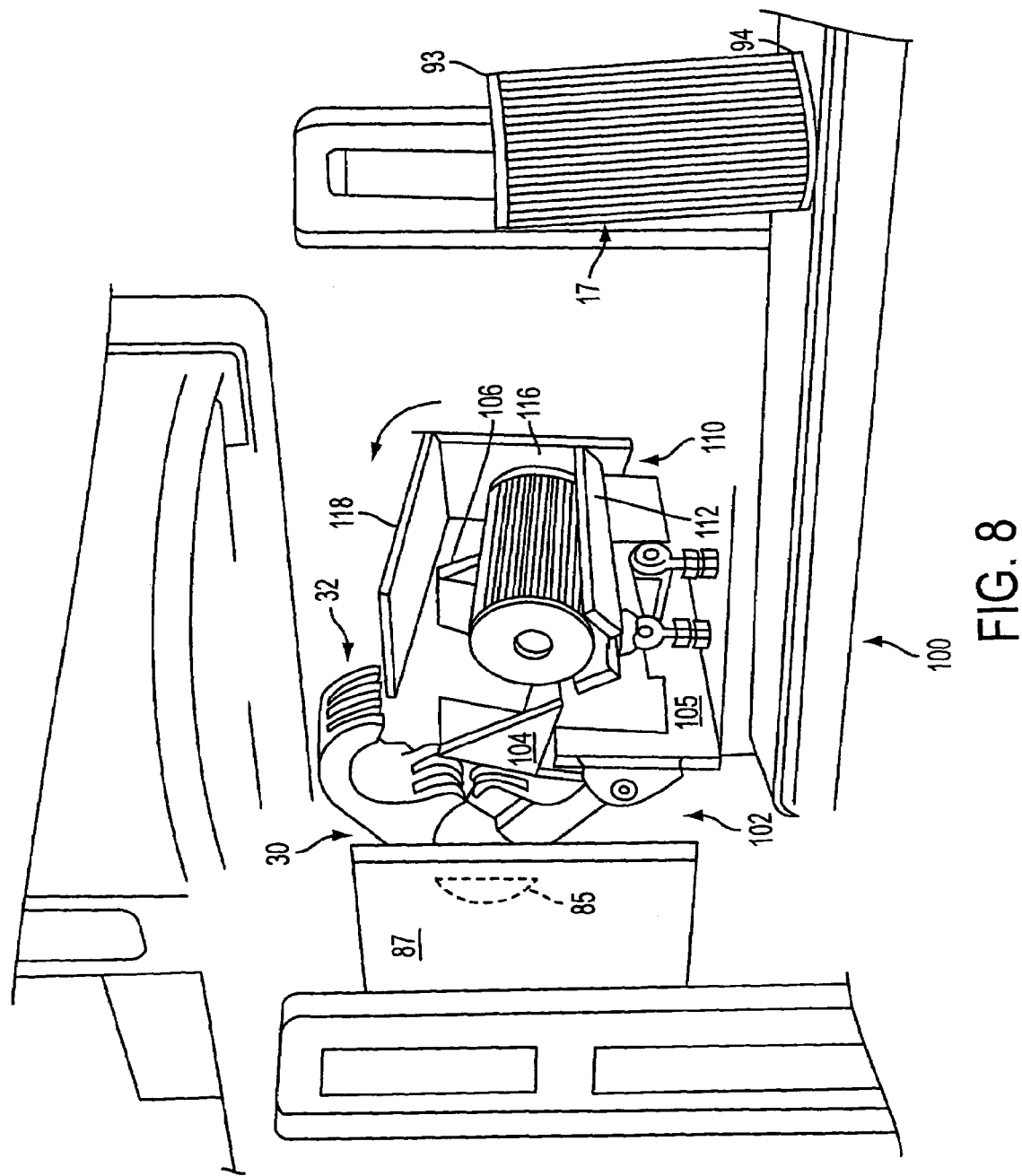
FIG. 8 is a perspective view of an unloading station, which is another part of the assembly line of FIG. 1.

Referring now to the drawings, an overview of an assembly line is shown generally at 10 in FIG. 1, from an overhead birds-eye vantage point. The assembly line of FIG. 1 operates according to a process involving a number of sequentially performed steps. The assembly line 10 depicted in the drawing is provided for assembling fluid filter cartridges 17 (FIG. 8). The filter cartridges 17 are, in turn, used as components in manufacturing spin-on oil filter assemblies, during which the cartridges are encased in hollow housings.

Figure 12D:
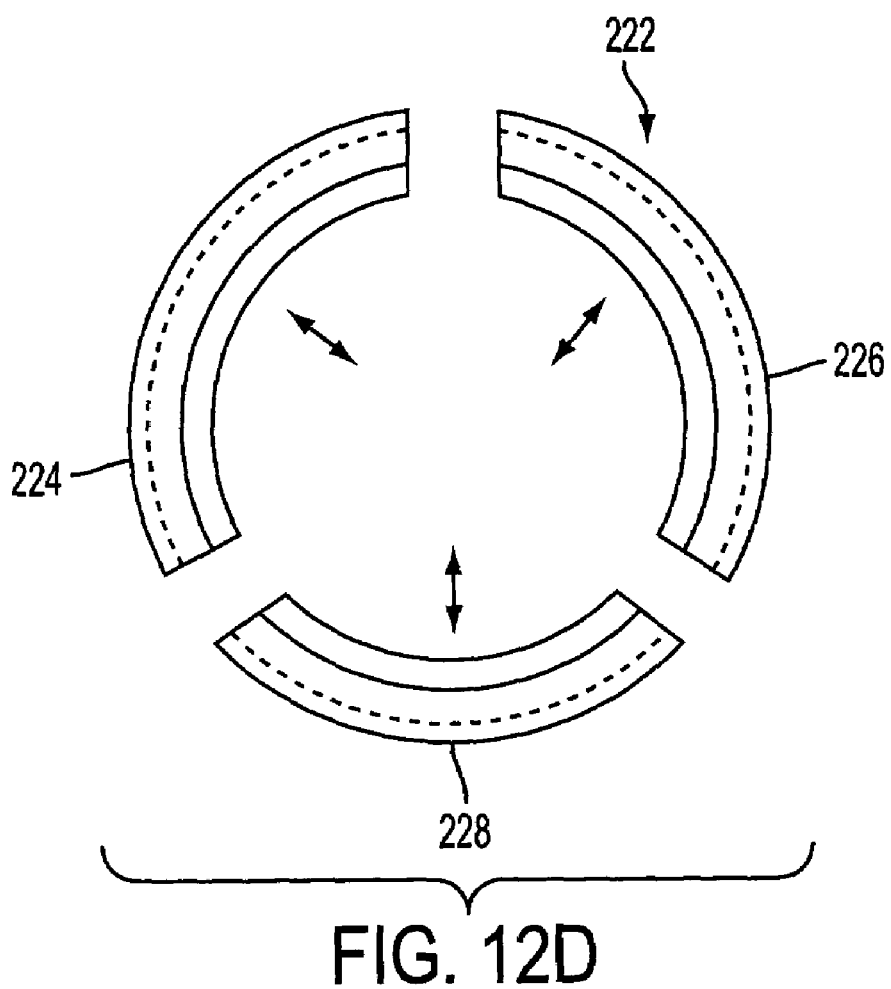
FIG. 12D is a top plan view of an annular clamping jig which is part of the emplacement applicator assembly of FIGS. 12A-12C.
Figure 12E:
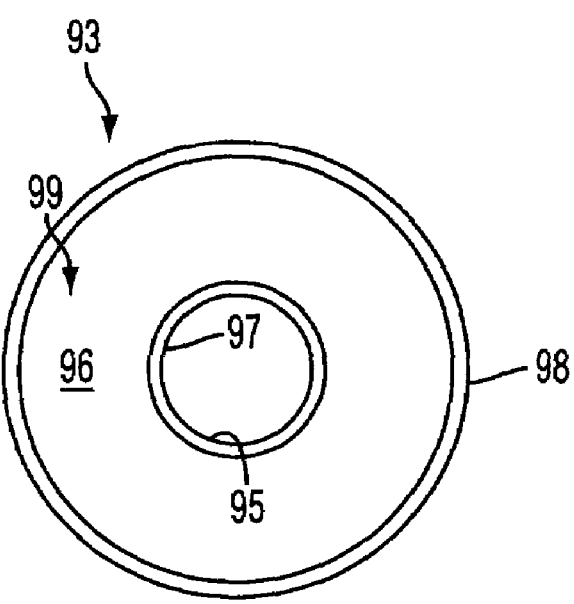
FIG. 12E is a top plan view of a hollow end cap which fits into the clamping jig of FIG. 12D.

Each filter cartridge 17 includes a porous filter element 20 (FIG. 2) having a center tube 22 therein, and two metal end caps 93, 94, which are affixed to opposite ends of the filter element with a plastisol adhesive. A first end cap 93 (FIG. 12E) has a hollow opening 95 formed centrally therethrough, and a second end cap 94 (FIG. 7) is closed at the central area thereof.

Figure 2:
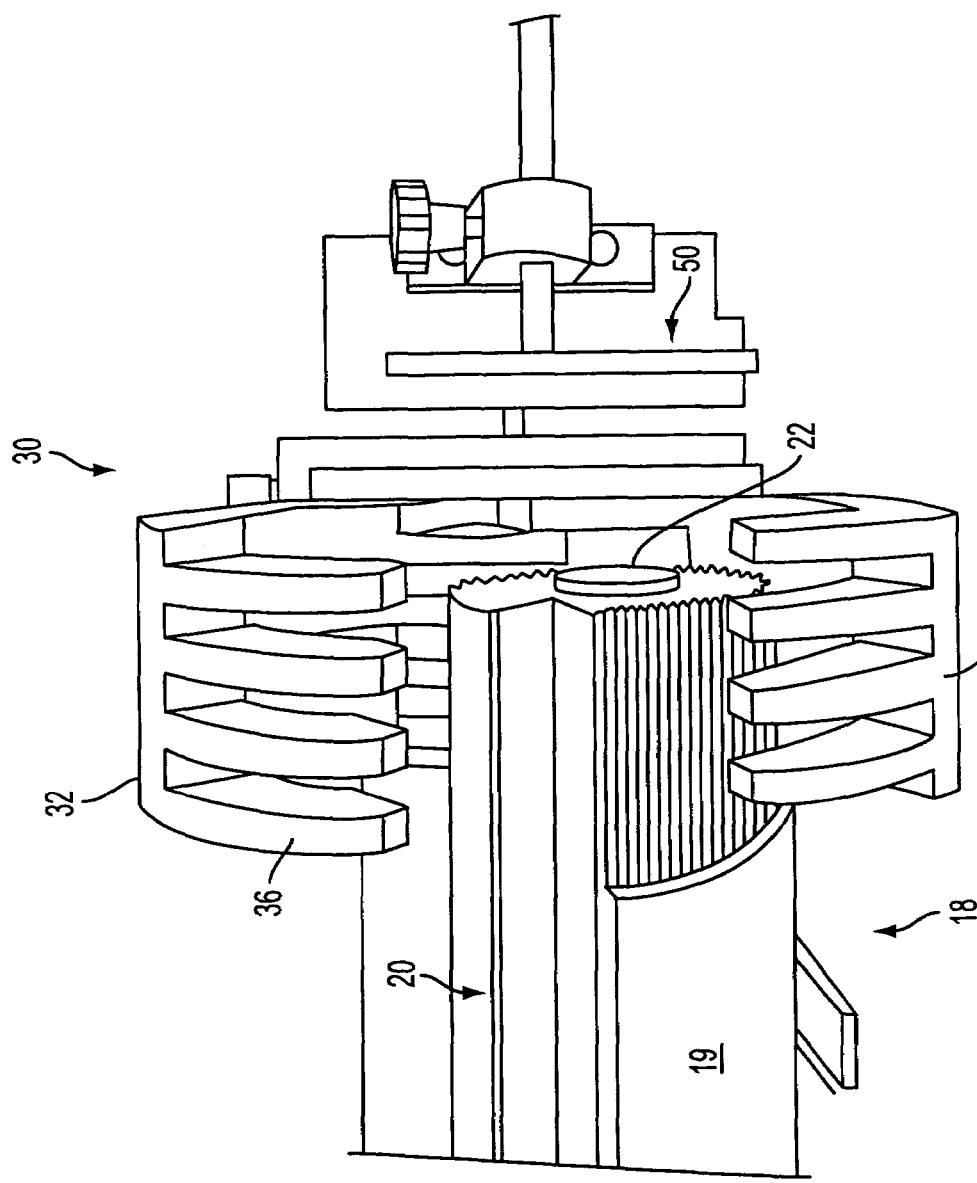
FIG. 2 is an end perspective view of a handling and transfer station according to the invention, which is a part of the assembly line of FIG. 1.

A series of spindles 12 may be seen at the lower right quadrant of FIG. 1. Each spindle 12 has an associated trough 14 for supporting a cylindrical filter element 20 from below. (The filter elements 20 are intentionally omitted from FIG. 1 for purposes of simplifying the illustration, but a filter element is shown in FIGS. 2-3). The spindle 12 and trough 14 move together as an assembly 15 on a continuous-loop feed conveyor 11. As seen best in FIG. 2, although made of accordion-pleated filter material, each filter element 20 is made substantially in the shape of a hollow cylinder, and is associated with a foraminous center tube 22 for reinforcing placement in the center thereof.

Transfer to Gripper Assembly

Referring now to FIGS. 1-3, the spindle/trough assembly 15 moves laterally on the feed conveyor 11, and transports the filter element 20 over towards a gripper assembly 30, which is initially in an open configuration to receive the filter element. The gripper assembly 30 provides a handling and transfer apparatus for a cylindrical workpiece, such as the filter element 20. The gripper assembly 30 is temporarily held in the open configuration thereof by pressure from an actuator 92 on a cam follower bearing 88 (FIG. 3).

The construction, component parts, and function of the gripper assembly 30 will be discussed in further detail below.

A paddle arm 16 pushes the filter element 20, and associated center tube 22, out of the trough 14, through a half-pipe guide sleeve 19, and into an upwardly curving lower jaw 34 of the gripper assembly 30. A computer-controlled servo motor 25 activates the paddle arm 14 to push the filter element 20 a measured distance forward, which moves it through the guide sleeve 19 and into the gripper assembly lower jaw 34, so as to center the element therein.

An adjustable stop member 50 may, optionally, also be provided, to limit the distance that the filter element 20 can travel forward from the guide sleeve 19.

The paddle a m servo may be programmed to push a different stroke distance, for a different-sized filter element, at the push of a button.

Referring in particular to FIGS. 2-5, the opposed jaws 32, 34 of the gripper assembly 30 are curved in opposite directions and define a cylindrical space therebetween when closed, to closely conform to the tubular shape of the filter element 20.

Figure 5A:
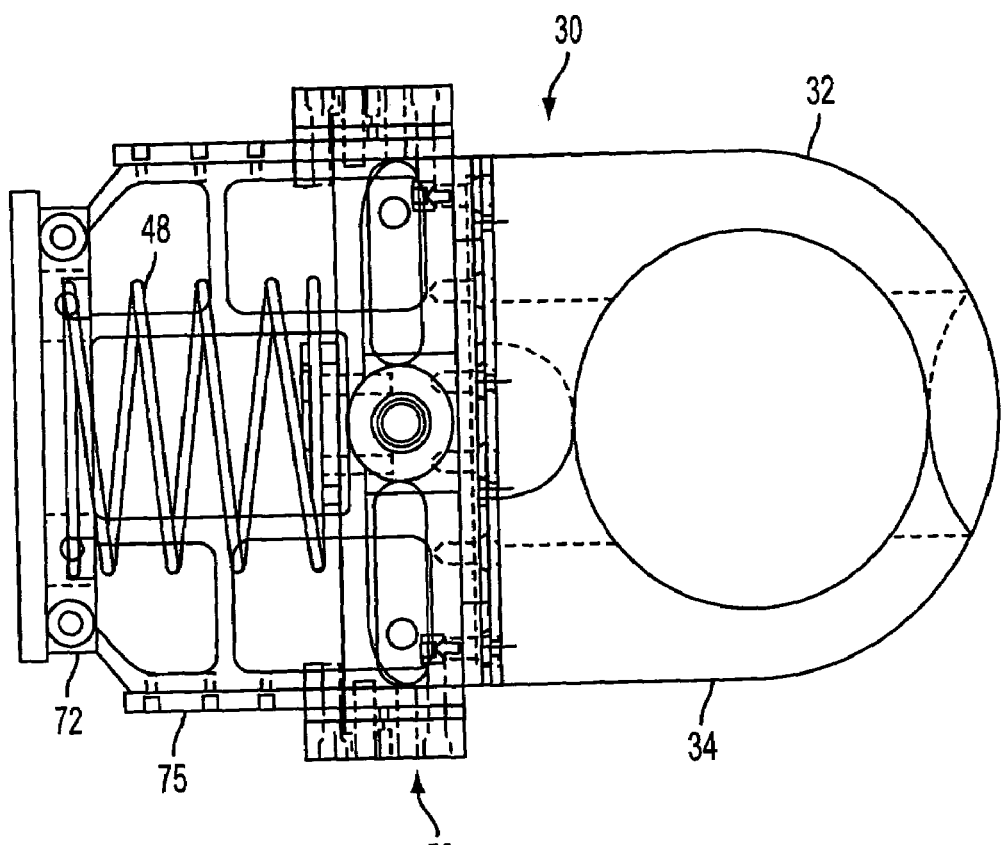
FIG. 5A is a side plan view of a gripper apparatus of FIGS. 2-3.
Figure 5B:
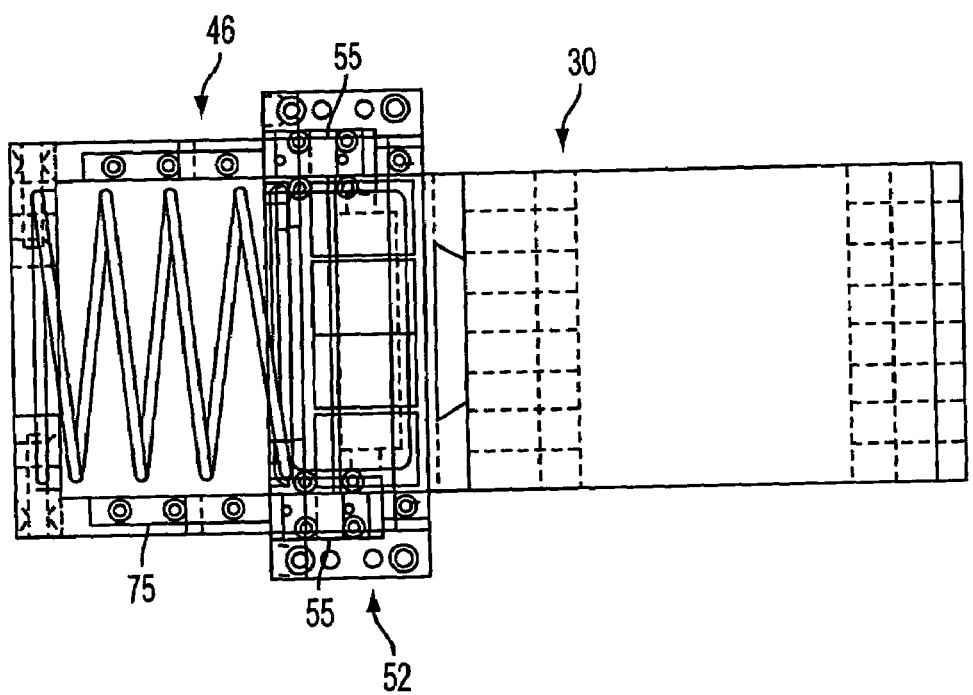
FIG. 5B is a top plan view of a gripper apparatus of FIGS. 2-3.

Each of the jaws 32, 34 includes a plurality of spaced-apart teeth 34, as shown, which mesh together when the jaws are closed, and which allow the jaws to interlock with one another, as they close around a filter element 20. As best seen in FIG. 5A, the outermost tips of the teeth 36 are tapered to help align a filter element 20 therebetween.

The teeth 36 mesh together to form a continuous reference surface while the un-constrained workpiece is grasped thereby. The intermeshing of the teeth 36 allows the jaws 32, 34 to constrain a previously un-constrained cylindrical workpiece to a matching cylindrical reference surface formed by the meshing of the two jaws. The tapered shape of the outermost tips of the teeth 36 help to correctly orient the cylindrical filter element 20 between the jaws 32, 34 without appreciable risk of pinching or damaging the element during orientation thereof.

Those in the art will understand that a simpler approach, using two opposed semi-cylindrical half shells could conceivably be used, instead of the depicted jaws 32, 34; however, this type of arrangement would not provide the advantage of properly orienting the workpiece that the intermeshing tapered teeth 36 give, but instead, would run the risk of damaging the workpiece, if it is not properly oriented.

Figure 6:
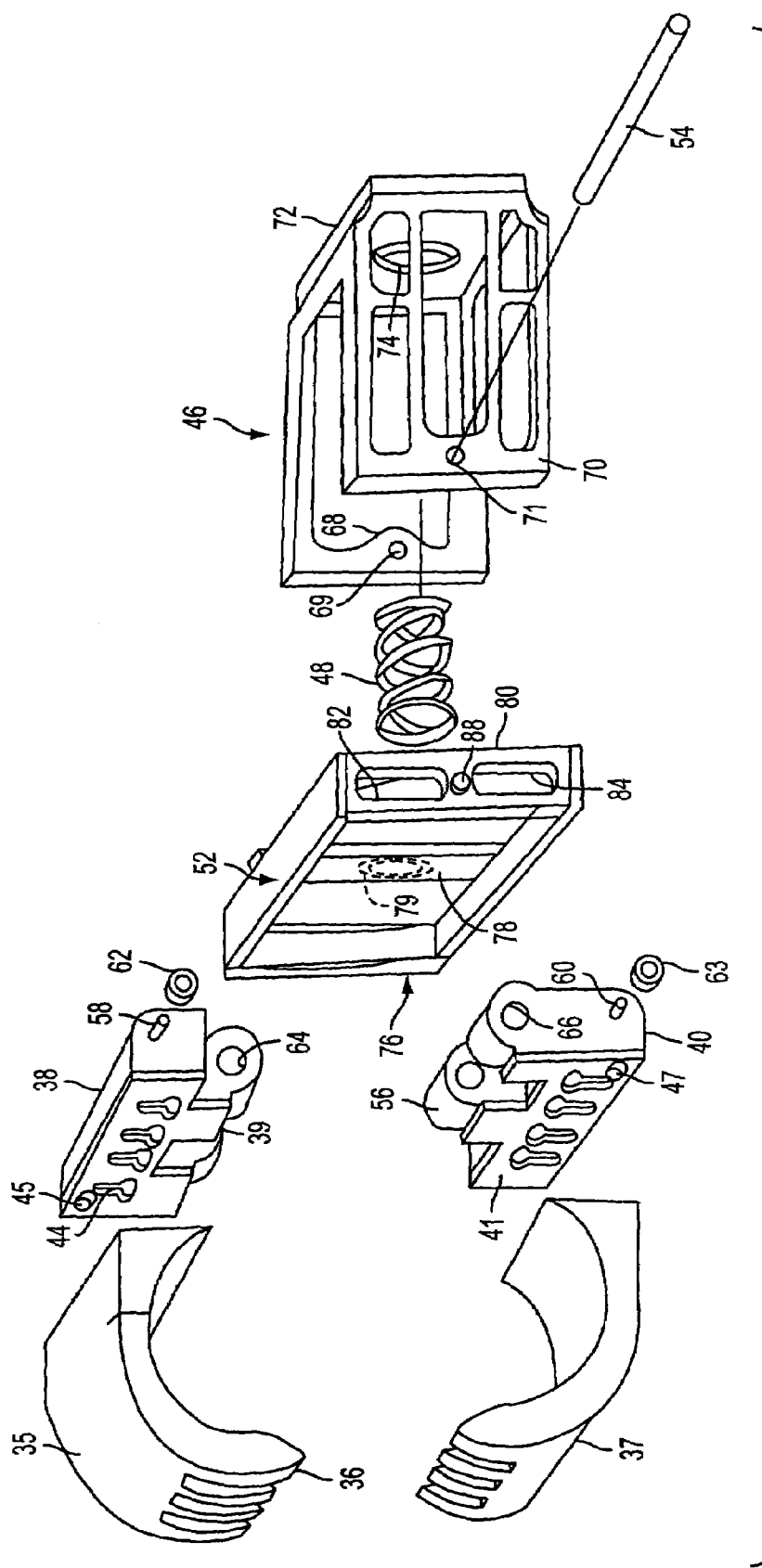
FIG. 6 is an exploded perspective view of the gripper apparatus of FIGS. 2-5, showing component parts thereof.

Referring now to FIG. 6, it will be seen that in a particularly preferred embodiment hereof, each of the individual jaws 32,34 may be made as a subassembly, and may be separated into component parts, i.e., a hinge portion and a jaw extension. The respective extensions 35, 37 include the teeth 36, as noted, and the extensions are quickly releasable and interchangeable from their respective hinge portions 38,40, to allow a user to remove the extensions and substitute replacement extensions (not shown) of a different size. This permits rapid line change-over to fit another size of filter being assembled, as appropriate.

The gripper assembly 30 is capable of accurately and repeatably holding any diameter workpiece to within 0.002 inches relative to the fixed center point shown in FIG. 5A. The center point remains at the center of the jaw extensions 35, 37, regardless of what size jaw extensions are used. This constant center point facilitates adjusting the apparatus for a different sized filter when the jaw extensions are changed. The fixed center point eliminates the need for any height changeover for the emplacement applicators and the inductive heaters, other than servo length setting, or for any adjustment to the unloader. These additional components will be explained at a later point herein.

Figure 9:
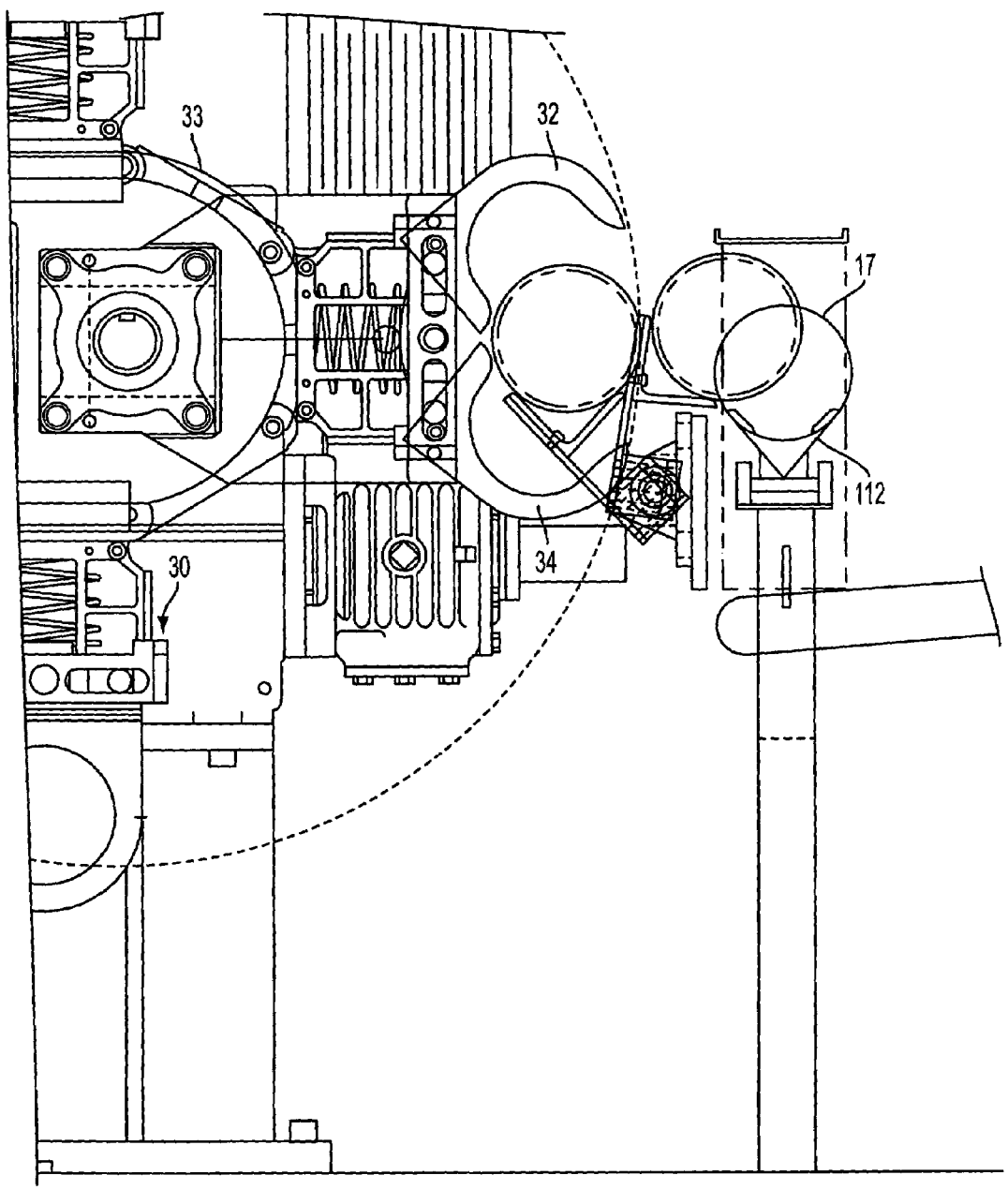
FIG. 9 is a side plan view of the unloading station of FIG. 8.

The gripper assembly 30 is one of a series of interconnected gripper assemblies which are substantially identical to one another. The multiple gripper assemblies 30 are mounted on a transport conveyor 33 (FIGS. 1, 9). The transport conveyor 33 is a chain loop conveyor that continuously cycles around, with pauses at the individual work stations.

Figure 7:
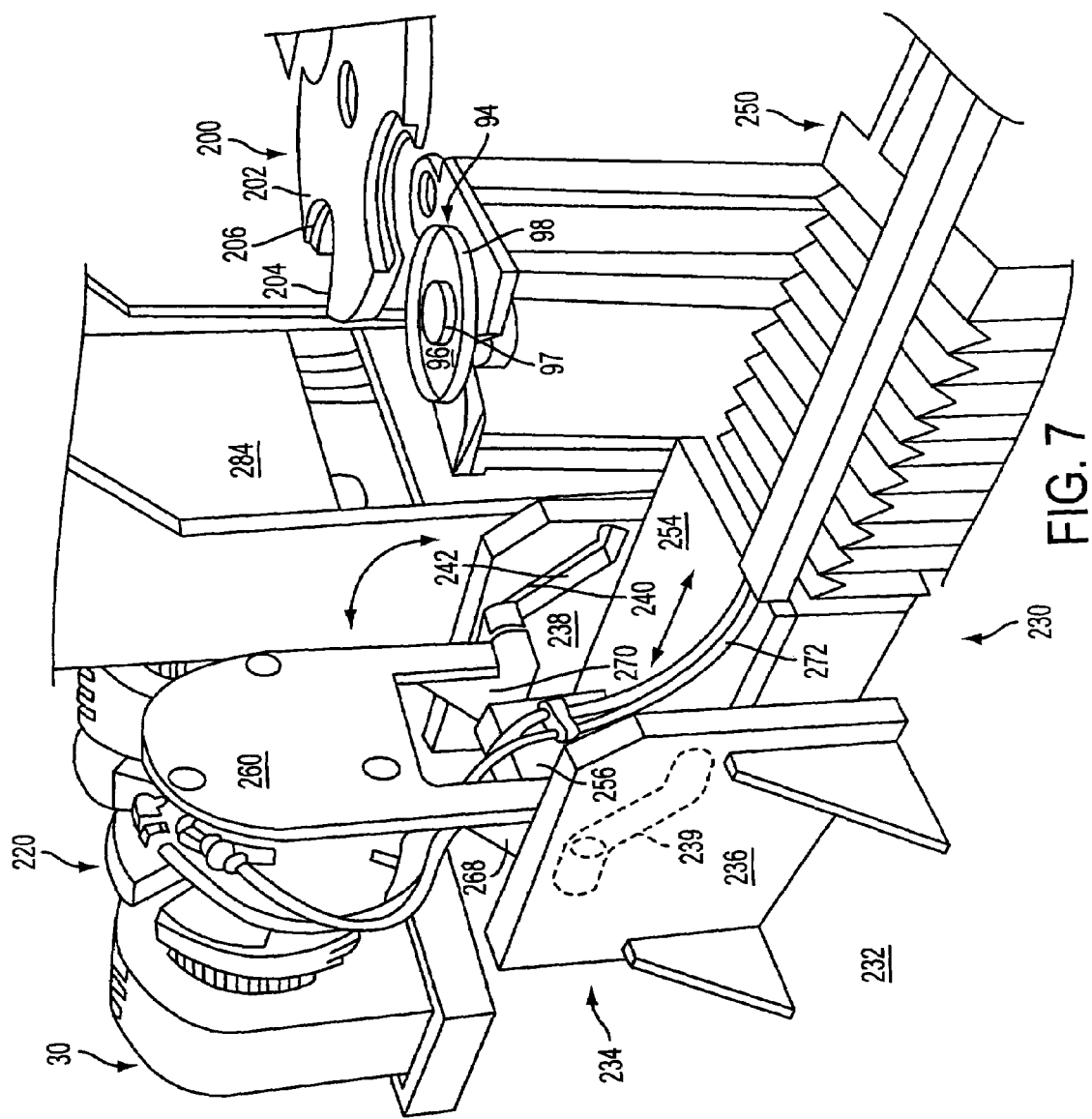
FIG. 7 is a perspective view of an end cap application station, which is also part of the assembly line of FIG. 1, and also showing an inductive heating apparatus.

The opposed jaws 32, 34 of an individual gripper assembly 30 will be in a first horizontal orientation thereof, as shown in FIGS. 2, 3, and 5 during the initial pick-up of a workpiece, but will then rotate 90 degrees, to the vertical orientation shown in FIG. 7, with the tips of the extensions pointing upward, as the gripper assembly moves along. Later in the assembly process, the gripper assembly 30 will again rotate 90 degrees to a second horizontal orientation thereof, for transferring the workpiece to a drop-off station 100, as shown in FIGS. 8-9. After drop-off, each of the closed gripper assemblies 30 will cycle back along the underside of the transport conveyor 33, to the point where it receives a new filter element 20 from the feed conveyor 11, to begin the cycle again. Three of the above-described primary orientations of the gripper assembly 30 may be seen in FIG. 9.

(At this point, ongoing discussion of the movement of an individual filter element 20, along the assembly line 10, will be temporarily suspended while the structure and function of the gripper assembly is described in detail. The discussion of the movement of the filter element along the assembly line 10 is resumed in the subsection entitled 'Closing the Jaws of the Gripper Assembly'.)

Structure and Function of the Gripper Assembly

In the illustration of FIG. 6, a particular preferred embodiment of the gripper assembly 30 is shown in exploded perspective view. It will be understood that the depicted embodiment is intended to illustrate, rather than to limit the invention. The gripper assembly 30 includes the upper and lower jaws 32, 34 as noted, and each of the upper and lower jaws is separable into a hinge portion and an extension, as outlined above.

The gripper assembly 30 also includes an inner cage 46, a spring 48, an outer cage 52, and a pivot pin 54. Each of these components of the gripper assembly 30 will be discussed in further detail herein.

The Gripper Jaws

The jaws 32, 34 each include a plurality of spaced apart teeth 36, as noted, and each of the jaw hinge portions 38,40 includes a plurality of spaced apart flanges 56.

In the depicted embodiment, each of the jaw hinge portions 38,40 has a cylindrical actuator shaft 58, 60, respectively, extending outwardly thereon. The cylindrical actuator shafts 58, 60 each carry a bearing 62, 63, respectively, rotatably mounted thereon.

In a particularly preferred embodiment of the invention, the respective shaft and bearing combinations 58, 62 and 60, 63 are provided as integral cam follower bearing assemblies.

For heavy duty applications, a second set of actuator shafts and bearing assemblies, which are identical to those shown in the drawing, may be provided on the parallel opposite side surfaces of the hinge portions 38,40. For a standard duty application, a single set is sufficient.

Each of the jaw hinge portions 38, 40 also has a hollow bore 64, 66, respectively, formed through the flanges 56, for receiving the pivot pin 54 therein, when the flanges are intermeshed with one another and placed within the inner cage 46.

Preferably, the jaw extension 35 has alignment studs 42 (FIG. 3) attached to and extending away from the innermost face thereof, and these alignment studs include enlarged heads, as shown. The alignment studs 42 may be inserted into wide portions of key slots 44 (FIG. 6) of the hinge portion 38, and then the extension 35 can then be slidably moved with respect to the hinge portion, in the direction of the key slots 44, to lock the hinge portion and extension together in an aligned configuration. The lower extension 37 is attached to the lower hinge portion 40 in similar fashion.

The jaw extensions 35, 37 are slid until they will not move any further, at which point a respective spring-loaded detent button 45, 47, attached to the cover plate, as shown, fits engagingly into a corresponding hollow cylindrical cavity (not shown) appropriately formed in the inward-facing surfaces of the jaw extensions. The hinge portions 38,40 are provided with appropriate conventional hardware to allow an operator to selectively release the detent buttons 45, 47 when the operator wishes to detach the jaw extensions 35, 37 from the hinge portions.

The Inner Cage

The inner cage 46 provides a housing for the jaws 32, 34, and with the respective flanges 56 of the jaw hinge portions 38, 40 intermeshed with one another, the jaws 32, 34 fit together inside of the inner cage 46.

The inner cage 46 has a generally box-like shape, which is open at two sides and an end thereof, as shown. The inner cage 46 includes two opposed side walls 68, 70 connected to a backing plate 72, substantially at right angles thereto. As viewed from above, in the orientation shown in FIG. 6, the inner cage 46 has a substantially U-shaped outline. The space between the side walls 68, 70, on each side of the inner cage 46, is preferably left open, to allow outward movement of the jaw extensions 35,37 without any interference or resistance by the inner cage structure.

For heavy duty applications, both of the side walls 68,70 may be provided with the structure and reinforcing bars shown on the near side wall 70 in FIG. 6. Otherwise, the inclusion of such structure on only one side wall 70 is sufficient.

In the depicted embodiment, each of the two opposed side walls 68, 70 of the inner cage 46 has a reinforced edge portion at the top thereof, as shown, and these reinforced edge portions have hollow bores 69, 71 formed respectively therethrough. The inner cage includes a solid backing plate 72, which interconnects the side walls 68, 70. In the depicted embodiment, the backing plate 72 has a circular groove 74 inscribed therein, to provide a first seat for the spring 48.

In a particularly preferred embodiment of the invention, the side edges of the inner cage side walls 68, 70 have track extensions 75 (FIGS. 5A, 5B) attached thereto, to guide sliding movement of the outer cage 52 thereon.

The Outer Cage

The outer cage 52 includes a generally rectangular frame 76, formed of four flattened frame sections connected to one another.

In the depicted embodiment of the invention, the outer cage 52 is provided with four micro-linear bearings 55 (FIG. 5B) attached thereto with conventional fasteners. The micro-linear bearings 55 are provided to roll along the tracks 75 of the inner cage, to smooth out and facilitate sliding movement of the outer cage 52 along the inner cage 46.

Those in the art will realize that other alternative, equivalent structure may be provided to guide slidable movement of the outer cage on the inner cage.

As shown in FIGS. 5A and 6, one frame section 80 of the outer cage 52 has a pair of linearly spaced apart guide slots 82, 84 formed therethrough. In between the guide slots, the frame section 80 has a post 86 affixed thereto, and extending outwardly thereon. Preferably, this post 86 has a cam follower bearing 88 (FIG. 3) rotatably attached thereto. In a particularly preferred embodiment of the invention, the post 86 and bearing 88 are provided together as a cam follower bearing assembly.

For heavy duty applications, the side of the outer cage 52 opposite the frame section 80 may also have guide slots formed therein which mirror the guide slots 82, 84 of the frame section 80, For standard duty applications, a single pair of guide slots is sufficient.

A central crossmember 78 bridges across, and is removably attached to, two of the sections making up the frame 76. In the depicted embodiment, the central crossmember 78 has a circular groove 79 inscribed in the surface thereof, which faces toward the backing plate 72, to provide a second seat for the spring 48.

Construction of the Gripper Assembly

In assembling the gripper assembly, the crossmember 78 is lined up between, and oriented parallel to the side walls 68, 70 of the inner cage 46, as shown. The outer cage is then placed over the inner cage, with the side walls 68, 70 inside of the frame 76, to slidably interconnect the inner and outer frames, with the spring 48 extending between the crossmember and the inner cage backing plate 72.

The jaw hinge portions 38,40 are then placed into the outer cage 52, with the flanges 56 aligned and intermeshed with one another, and with the bearings 62, 63 installed in the guide slots 82, 84 of the outer cage frame section 80, as seen in FIG. 5A. The jaw extensions are then connected to their corresponding hinge portions, as previously described.

After the jaws 32, 34 are installed inside the inner cage, with the bores 64, 66 aligned with one another and with the bores 69, 71 of the inner cage, the pivot pin 54 is inserted through, and is anchored in the hollow bores 69, 71 of the inner cage side walls 68,70, to pivotally attach each of the jaws 32, 34 to the inner cage 42. The actuator posts 58, 60 extend outwardly from the inner cage, between the bars thereof, and the bearings 62, 63 fit slidably inside of the guide slots 82, 84 of the outer cage.

(The present discussion now returns to the progression of a filter element 20 along the assembly line 10.)

Closing the Jaws of the Gripper Assembly

Referring now to FIG. 3, it will be seen that after the filter element 20 has been placed in the lower jaw 34 of the gripper assembly 30, the actuator 92 releases its pressure on the cam follower bearing 88, which is connected by the post 86 to the outer cage 52. This movement of the actuator 92 releases the force which has been compressing the spring 48 in the inner cage 46. The outward pressure of the spring 48 pushes the outer cage 52 away from the base plate 72, and moves the outer cage relative to the inner cage. The outward movement of the outer cage puts pressure on the shafts 58, 60 of the jaw hinge sections, via the bearings 62, 63.

Since the flanges 56 of the jaw hinge portions are pivotally, but not slidably attached to the inner cage 46 by the pivot pin 54, movement of the shafts 58,60 moves the opposed jaws 32, 34 around the pivot pin 54, until the teeth of the jaws intermesh and the jaws contact one another, clamping the filter element therebetween.

It is a feature of the present invention that the default position of the jaws 32, 34 is in the closed position illustrated in FIG. 5, due to the mechanical action of the spring 48.

This design has the advantage of being able to continue to accurately hold a workpiece even in the event of a power interruption, because of the relatively unencumbered construction and arrangement of the gripper assembly 30. No external power source is required for the gripper assembly 30 to continue to securely and accurately hold a workpiece therein, once the workpiece has been picked up. The force of the spring 48 will continue to urge the jaws 32, 34 closed, until a countervailing force is applied to overcome the spring force.

The End Caps

Figure 13:
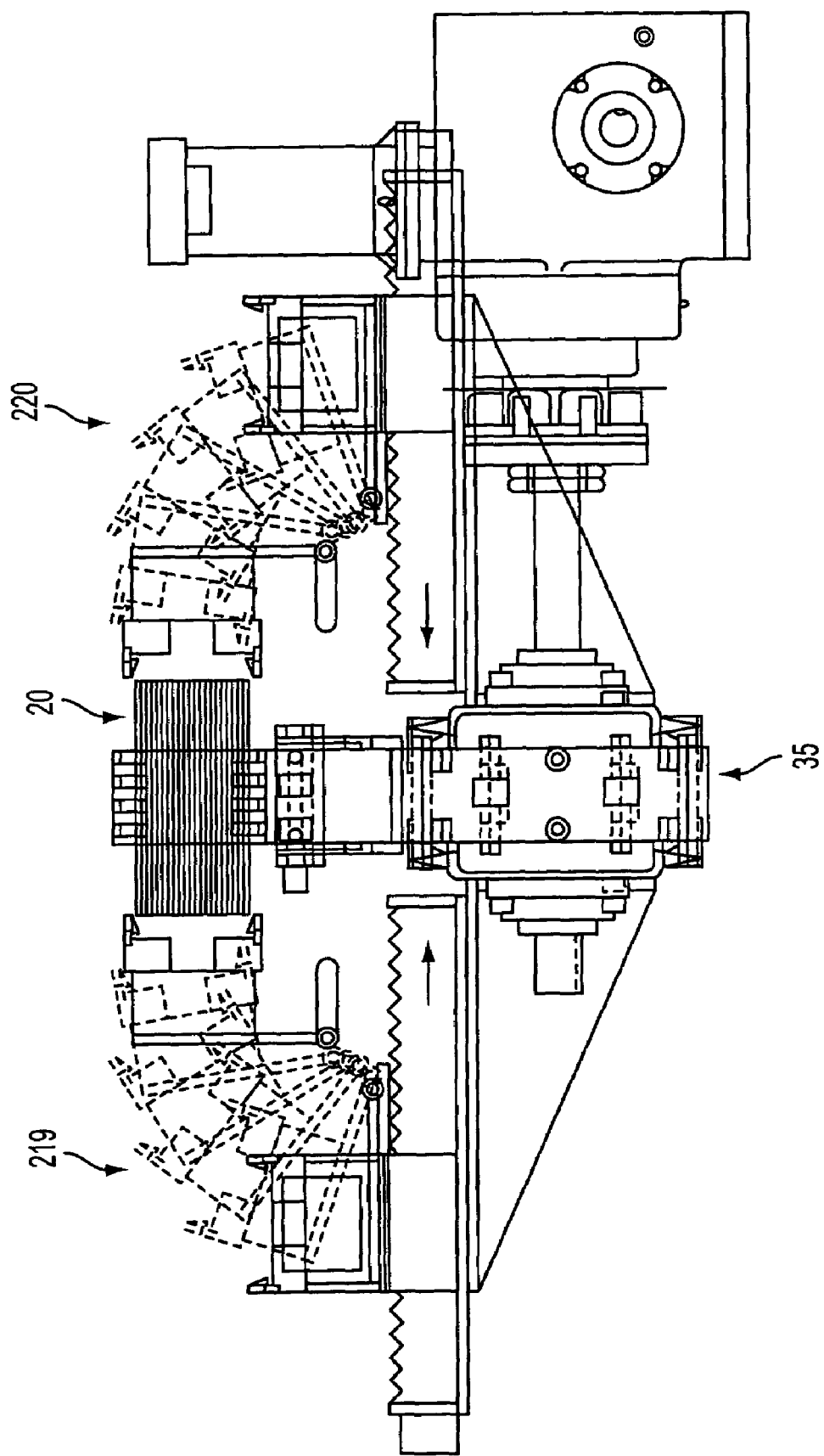
FIG. 13 is a side plan view of the application station of FIG. 7, showing a juxtaposed progressive time-lapse sequence of positions of the two opposed end cap emplacement applicators.

After the filter element 20 has been securely grasped, the gripper assembly 30 then moves the filter element, via the transport conveyor 33, to an end cap mounting station, shown in FIG. 7, where two end caps are simultaneously placed on opposite ends of the filter element. This simultaneous placement is illustrated in FIG. 13.

Only the second end cap 94 is shown in FIG. 7, but the first end cap 93 looks substantially similar to the second end cap in the drawing, with the exception that the central portion of the first end cap has a hollow aperture 95 (FIG. 12E) formed through the center portion thereof, which is necessary for the proper functioning of the filter cartridge assembly 17. It will therefore be understood that the following description of the second end cap 94 also applies to the first end cap 93, with the single difference that the first end cap 93 has a centrally located hollow aperture 95 therein, radially internally of the inner edge portion thereof.

In the practice of the present invention, the end caps are preferably made of metal. Each end cap 93, 94 has a circular outline as seen in the top plan view of FIG. 8, and includes a flattened 0-shaped base 96 and inner and outer side walls 97, 98 integrally formed with the base and extending outwardly therefrom and substantially transverse thereto. Together, the base 96 and edge portions 97, 98 form an annular tray, and define a hollow receptacle 99 therebetween for holding a measured amount of adhesive, and for receiving a peripheral end of the filter element 20 therein.

At a location spaced away from the area where the gripper assembly picks up the filter element 20, an operator loads individual end caps into a belt-driven feeder conveyor 23 (FIG. 1), which sequentially transfers the end caps to a rotary indexer 200. The belt-driven feeder conveyor uses two parallel continuous-loop belts, running on two pairs of spaced-apart pulleys, to move the end caps in the desired direction.

Separate and simultaneously operating end cap feed lines 27,29 (FIG. 1) are provided for each type of end cap 93, 94. The end caps are mechanically placed in sequence on the feeder conveyors 23, with the end cap openings 99 facing up.

The different stages in the simultaneous treatment of two end caps 93, 94 on a parallel set of conveyors, rotary indexers 200, and emplacement applicators 220 is substantially identical on both end cap feed lines 27, 29 (FIG. 1), except for the final orientation of the respective emplacement applicators, which are mirror images of one another, as shown in FIG. 13. Accordingly, a description of the end cap movement along only one of the two feeder conveyors is necessary here, and it will be understood that each operation is being concurrently performed on a second end cap using a corresponding second system, of like design.

It is also notable that the end caps 93, 94 are moving along their respective conveyors 23, and then are transferred to their respective emplacement applicators, at the same time that the filter element is being picked up by the gripper assembly and transferred to the application station. The adhesive-filled end caps and filter element meet at the application station, as will be further described.

The Dispensing Operation

The end caps move on the conveyor to a rotating circular dial plate 202 of a rotary indexer 200, where they are filled with uncured plastisol resin (not shown).

The rotary indexer 200 has four identical openings 204 formed in the dial plate 202 thereof, and only three of these openings are used at any given time in the assembly process.

First, the feed conveyor 23 feeds an end cap 93 to the dial plate 202 for initial pickup. The opening 204 of the dial plate 202 is provided with a ledge 206 for supporting placement of an end cap thereon, and the feeder conveyor 23 feeds an end cap into the opening and on top of the ledge.

Figure 10:
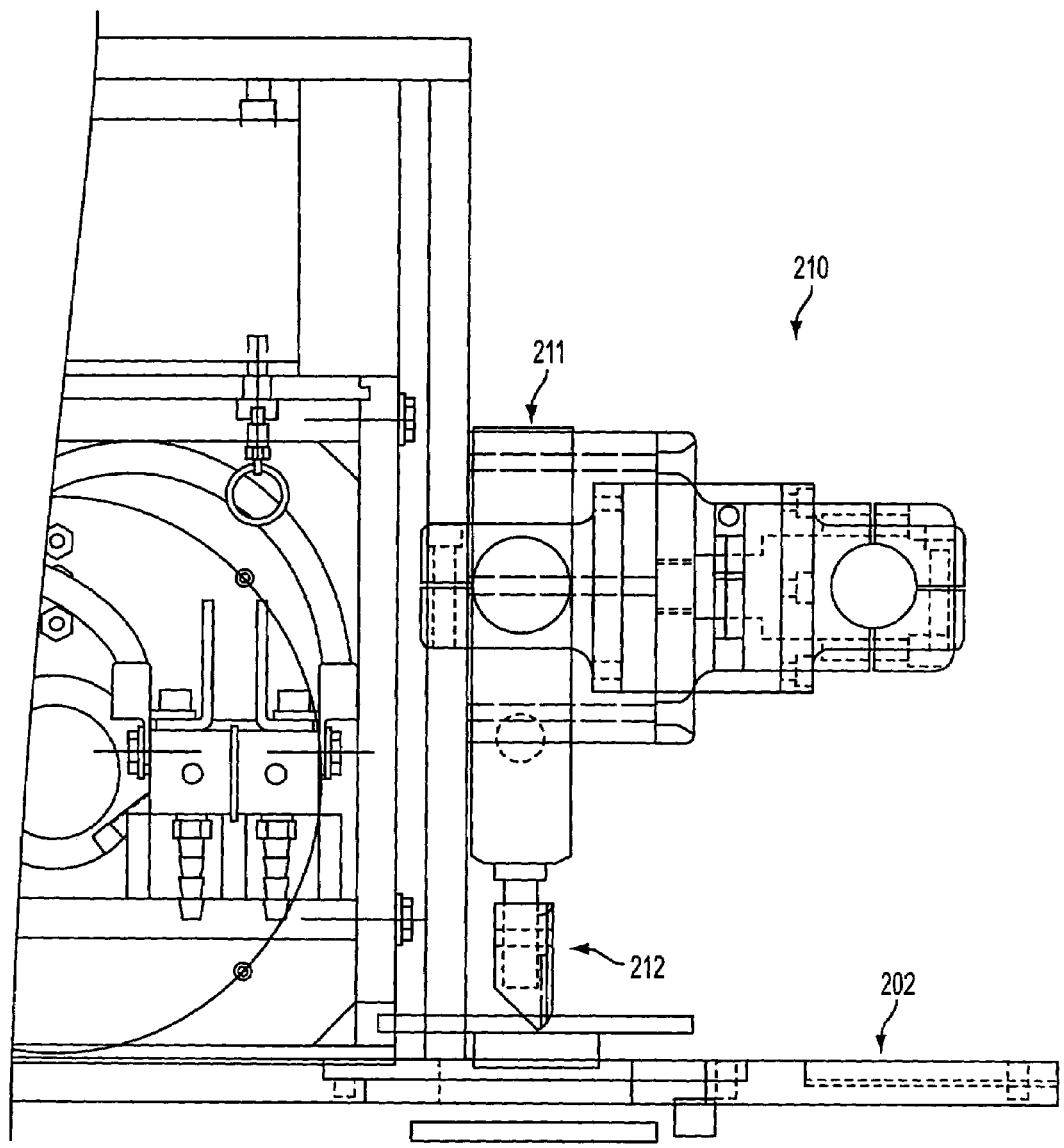
FIG. 10 is a side plan view of an adhesive dispensing apparatus.
Figure 11A:
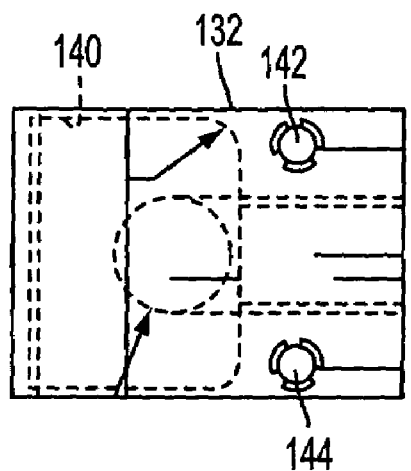
FIG. 11A is a top plan view of a nozzle according to the invention which is usable with the dispensing apparatus of FIG. 10, showing internal passages in phantom.
Figure 11B:
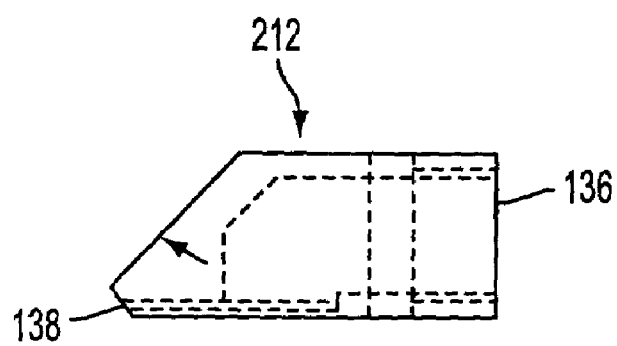
FIG. 11B is a side plan view of the nozzle of FIG. 11A.
Figure 11C:
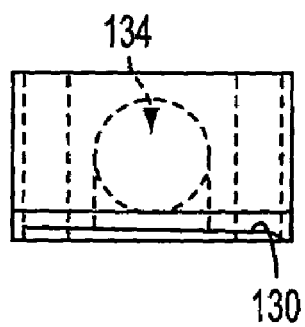
FIG. 11C is an end plan view of the nozzle of FIG. 11A.
Figure 11D:
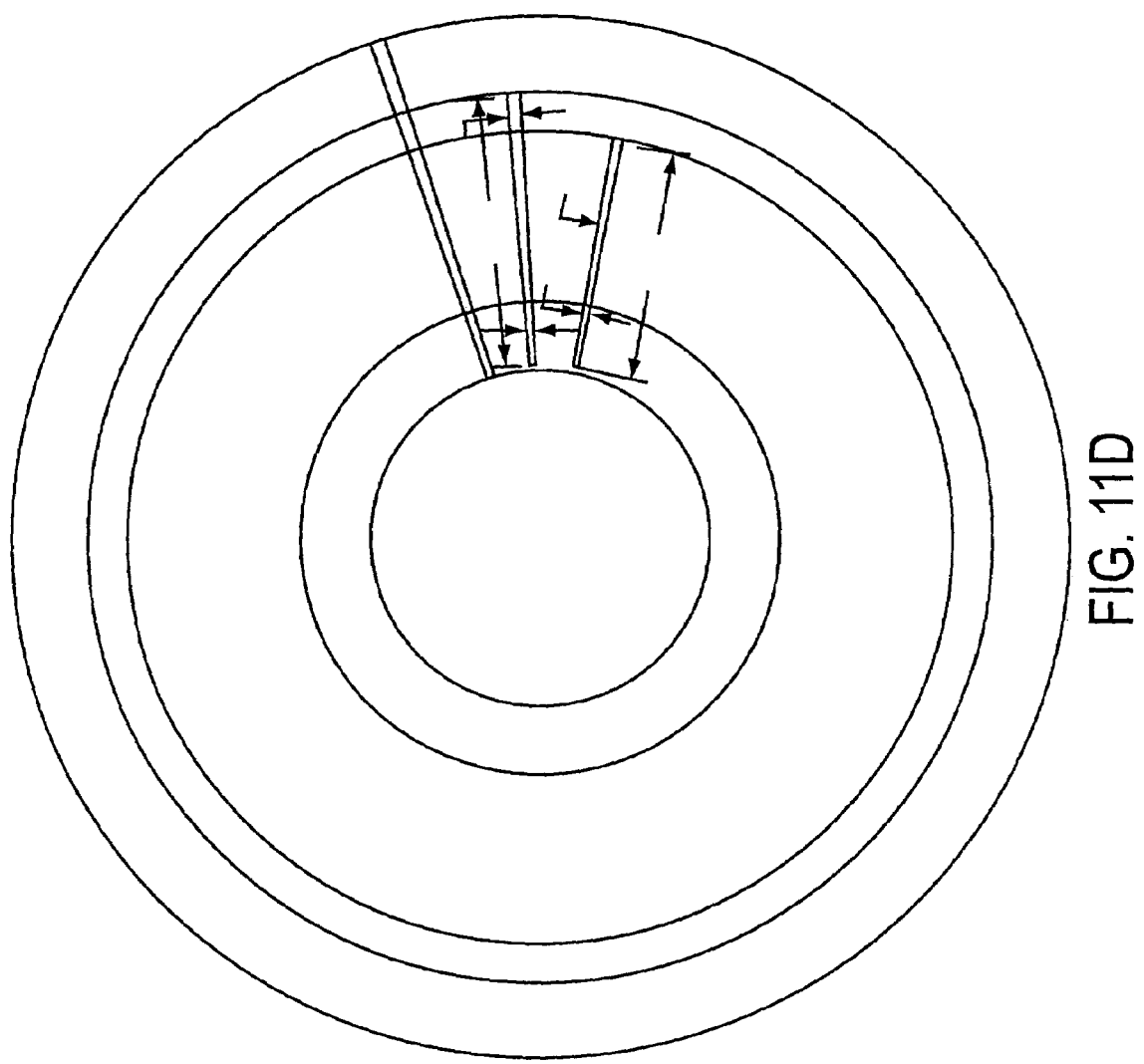
FIG. 11D is a diagram showing origin of the aperture of the nozzle in FIGS. 11A-11C.

The dial plate 202 then rotates 90 degrees through a horizontal plane, to move the end cap to a fill station 210 (FIG. 10).

At the fill station 210, a linear actuator temporarily lifts the end cap off of the dial plate 202. A dispenser 211 is selectively fed measured batches of plastisol adhesive, under controlled pressure conditions, through an adhesive flow circuit. Flow of the adhesive is precisely controlled by enabling and disabling an electrically controlled solenoid valve.

The end cap is lifted from the dial plate by a linear actuator, having a rotatable turntable thereon. Adhesive flow is initiated when the end cap reaches the level of a dispensing nozzle 212. Each operative end cap is individually rotated a full 360 degrees on the turntable, while the dial plate is held steady below the end cap, and a dispensing nozzle 212 precisely dispenses the needed amount of plastisol therein. After one full rotation, flow through the nozzle 212 is stopped, and the linear actuator then retracts and replaces the end cap in the opening of the dial plate 202.

The Dispensing Nozzle

The dispensing nozzle 212 is formed having an outlet formed as a substantially trapezoidal aperture 130 therein, to correctly distribute the material in a graduated and increasing fashion, from the inside diameter of the end cap out to the outside diameter thereof. As best seen in FIGS. 11A-11D, the diameter of the nozzle aperture 130 is based on a wedge-shaped section cut out of a ring shape, using substantially radial straight lines, intersecting the ring to define the top and bottom sides of the wedge. Nozzle aperture width is chosen to correspond to the width of the end cap recess 99 for a particular filter cartridge, and three different examples of nozzle aperture widths are shown in FIG. 11.

Most preferably, the wedge shape of the nozzle aperture is calculated to be proportional to the circumferences of the inside and outside diameters of the end cap. This compensation is necessary, because more material is needed around the end cap outside diameter than is needed around the inside diameter, due to the greater distance around the outside diameter. This relationship is shown in FIG. 11.

Specifically, the ratio of the nozzle aperture width at the outside diameter to the nozzle aperture width at the inside diameter is ($\pi$)(outside diameter) divided by ($\pi$)(inside diameter) equals (O.D/I.D.) The relationship is linear between these points, so the gap simply narrows uniformly from the O.D. to the I.D.

As best seen in FIG. 12, the nozzle 212 is formed as a hollow body 132 from a hollowed-out piece of material, which is preferably a metal. The nozzle 212 has a flow passage formed therethrough, including a cylindrical bore 134 formed therein defining an inlet 136. The flow passage enters an end surface of the nozzle body 132 via the bore 134, continues inwardly until it is about halfway through the body, and then makes a substantially right-angle turn, as shown. After turning, the flow passage communicates with a substantially flattened channel 140 formed in the outlet end of the nozzle body. The flattened channel 140 has a wedge-shaped cross section corresponding to the nozzle aperture 130. A pair of mounting holes 142, 144 may be formed through the body 132 of the nozzle, but the mounting holes are not required.

The nozzle inlet is formed as a hollow cylinder, having female threads formed therein, to allow the nozzle to be threadably and rotatably attached to the dispenser.

The tip of the nozzle is tapered, as shown, and the nozzle has a substantially flattened end face formed in the tip thereof, with the outlet aperture formed in the substantially flattened end face. The substantially flattened end face is disposed at an angle with respect to an adjoining surface of the nozzle, to facilitate and direct fluid flow therefrom.

The result of this nozzle design is that a ribbon of adhesive is dispensed with the same thickness at the inside diameter of the end cap and the outside diameter thereof, as well as in between, in a single rotation of the end cap. This is a significant improvement over the previously known adhesive dispensing apparatus, which required both multiple rotations of the end cap, and subsequent "combing" of the dispensed adhesive, to achieve a uniform adhesive thickness within the end cap. It will be evident from the above discussion that the wedge-shaped nozzle aperture provides for a faster and more efficient dispensing operation than was previously possible.

When the end cap has been filled with the correct amount of plastisol, the dial plate spins another 90 degrees, and a 'walking beam' then picks up the filled end cap from the rotary indexer and places the end cap in a holding fixture, shown supporting the end cap 94 in FIG. 7. The adhesive is allowed to stabilize in the holding fixture for one quarter rotation of the dial plate 202, after which, the filled end cap is placed into a substantially annular constrictable clamping jig 222, of an emplacement applicator assembly 220.

The Clamping Jig

The substantially annular clamping jig 222 (FIG. 9) includes a cylindrical body attached to the applicator plate, and a circular collar which is movably mounted on the cylindrical body. The circular collar is made up of three individual arcuate segments 224, 226, 228, respectively, which are movably attached to the cylindrical base. Each of the arcuate segments 224, 226, 228 can be reciprocally and radially moved, with respect to the center point of the clamping jig, in the direction of the two-headed arrows shown in FIG. 12D. Each segment of the clamping jig is substantially identical to the other segments, and when moved close together into edge-to edge contact with one another, the three segments 224,226, 228 define a circular hollow therebetween for holding an end cap 93 therein. The circular collar includes an inwardly tapered inner edge 225, for compressively forcing the peripheral outermost edge of the filter element inwardly as the collar moves therepast. The tapered inner edge 225 is provided to ensure that the entire circumference of the peripheral edge fits within the hollow end cap receptacle, inside the outer side edge of the end cap.

The end cap application station 230 includes a stationary support base 232, and a guide member 234 which is fixedly attached to the stationary support base. In the preferred embodiment of the invention, the guide member 234 includes a pair of parallel opposed, substantially vertical first and second guide plates 236, 238, respectively. Each of the guide plates 236, 238 has a respective guide groove 239, 240 formed therein. The guide grooves 239, 240 face inwardly towards one another, and are substantially similar in shape and size. Each of the guide grooves 239, 240 defines a ramp, such as that shown at 242, therein.

Those skilled in the art will realize that an equivalent alternative design could be made with opposed wedge-shaped ramps (not shown) rather than the guide plates of the depicted embodiment, and that such ramps, where used, would accomplish substantially the same result in substantially the same way.

As best seen in FIG. 12, in the preferred embodiment of the invention, the guide groove 240 is formed in a stretched-out forward or reverse "S" shape, as shown. This preferred guide groove construction includes a substantially horizontal first section 244 at its lowermost part; a second section 245, which is disposed at an angle with respect to the first section, and which defines the ramp 242 at the bottom surface thereof; and a substantially horizontal third section 246 at the top part of the groove.

The guide grooves produce both the linear and rotary motion of the emplacement applicator assembly 220 using only one axis of movement. The elongated upper horizontal third section 246 of the guide groove accommodates varying filter sizes, without requiring a mechanical changeover of the guide member 234. This is greatly simplified from the previously known assemblies for providing a combined linear and rotary motion.

A push bar 250 is situated above the support base 232 of the application station 230, and the push bar is linearly and reciprocally slidable with respect to the stationary support base. A servo motor 252 is provided to power sliding movement of the push bar 250. The push bar 250 has a drive plate 254 affixed thereon, at the top thereof. The drive plate 254 has an integrally attached spacer 256 affixed thereto and extending upwardly thereon, and the spacer has an axle shaft 257 passing horizontally therethrough, to provide a pivot connection between the drive plate and a back plate 260 of an emplacement applicator 220, as will be further described below.

The Emplacement Applicator

In the application station depicted in FIG. 7, an emplacement applicator 220 is provided for placing an end cap 94 on an end of the filter element 20. As previously noted, and as illustrated in FIG. 13, an emplacement applicator is provided for each end cap 93, 94. The drive plate 254 may be viewed as part of the emplacement applicator 220. The emplacement applicator 220 includes a back plate 260 which is pivotally attached to the drive plate 254 via the axle shaft 257, by virtue of a hollow passage formed through appropriate sections thereof. Although the back plate 260 may be pivotally moved from a flat position to an upright vertical position as shown in FIG. 12, for purposes of convenience, the back plate will be described in the upright orientation thereof shown in FIG. 7. It will be understood that the relative descriptive terms for the different parts of the back plate 260 are used to illustrate, rather than to limit the invention.

The back plate 260 has an upper part 262 shaped like a capital letter "D" turned to rest on its flat edge, and a lower part which is operatively pivotally attached to the drive plate 254 at a pivot connection 255. The lower part of the back plate 260 consists of two legs 264, 266 which are integral with the upper part 262 and which extend downwardly therefrom on opposite sides thereof. Each of the legs 264, 266 has a transverse flange 268, 270, attached thereto and extending forwardly thereon, and the front part of each flange has a cylindrical bore formed therein, which receives the axle shaft 257 therethrough, to pivotally mount the back plate 260 to the upper end of the drive plate spacer 256.

At the base of the back plate 260, each of the legs 264,266 has a respective cam follower bearing assembly 265,267 attached to an inner edge portion of the transverse spacer 256, which is spaced away from the pivot connection 255 and from the axle shaft 257. The races of the cam follower bearing assemblies 265,267 are disposed resting on the ramps of the respective guide members, as shown in FIG. 7.

It will be understood from the foregoing, and from a review of the relevant drawings, that when the push bar 250 forces the emplacement applicator assembly 220 inwardly, the cam follower bearing assemblies 265, 267 ride up the respective ramps of the guide grooves 239,240, thereby pivoting the back plate 260 around the pivot connection 255, (defined by the axis shaft 257 pivotally interconnecting the drive plate vertical boss 256 with the back plate 260 at the transverse flanges 268, 270). This causes the applicator back plate 260 to move from a substantially horizontal orientation to a substantially vertical orientation thereof.

The above-described arrangement of the emplacement applicator 220 allows it to reliably and reproducibly emplace an end cap 94 on the end of a filter element 20 with a great degree of precision, reliability and reproducibility so as to provide a more standardized filter cartridge assembly than was heretofore possible.

FIG. 13 illustrates various positions of the two opposed emplacement applicators 219, 220, as they move toward simultaneously emplacing the end caps 93, 94 on the filter element 20. Intermediate positions of the applicators are shown in phantom. The end caps 93, 94 are omitted from FIG. 13 for purposes of simplifying the illustration.

Once the two end caps 93,94 have been emplaced on opposite ends of the filter element 20, the end cap clamping jig 222 is activated to move the segments radially outwardly, to release the end caps therefrom. The opposed push bars are then retracted, by activating two synchronized servo motors, connected to threaded shafts which pass through the push bars, to move the emplacement applicators 219,220 back to the horizontal orientation thereof, where they can pick up the next two end caps 93, 94.

Due to the thixotropic nature of uncured plastisol adhesive, there is no significant problem with flow of uncured adhesive downwardly within the end cap in the short time between the placement of the end cap on the filter element and the pre-cure operation.

Pre-Cure

After the end caps 93, 94 have been emplaced on the filter element 20, the transport conveyor 33 advances the gripper assembly 30 to a pre-cure station 280 (FIG. 14), where it is placed between two inductive heating assemblies 282,284, which incorporate electromagnetic field (EMF) generators. Inductive heating assemblies are relatively well known and are commercially available; however, it is applicant's understanding that inductive heaters have not been used in connection with a filter cartridge assembly apparatus and method.

The inductive heating assemblies 282, 284, are respectively mounted on opposite ends of a double ball screw 286 for simultaneous motion in opposite directions, and they move into close proximity to the end caps. The double ball screw 286 is operated by a servo motor 288. As shown in the drawing, the double ball screw includes a shaft which is rotatably mounted in a support structure. A first end of the shaft is threaded in a first direction, such as with a standard right-hand thread, while the opposite end of the shaft is threaded in a second direction which is the opposite of the first direction. Matching female threads are provided inside each of the heating assemblies 282, 284 corresponding to the part of the shaft that the heating assembly is mounted on. In this way, spinning the shaft, in a single direction of rotation, causes the heating assemblies 282, 284 to move in opposite directions.

Each of the inductive heating assemblies 282, 284, then generates a high-frequency electromagnetic field surrounding its respective associated end cap 93, 94. The electromagnetic field induces current flow within the metal of the end cap, thereby generating heat and rapidly heating the end cap to partially cure the plastisol resin therein, sufficiently to form a bond between the end cap and the filter element 20, and to fix the position of the end cap with respect to the filter element.

The inductive heating assemblies 282, 284, do not themselves become hot, which has two distinct advantages, as compared to a conventional heating element, in the method according to the present invention. First, the cycle time is very quick, generally less than two seconds per part. Second, in the event that some plastisol adhesive should inadvertently get on the inductive heating assemblies 282, 284, there will not be any bonding of an end cap on to one or the other of inductive heating assemblies, possibly leading to a production stoppage, as there might otherwise be with a conventional heating element that had become contaminated with plastisol.

This pre-cure step is important for several reasons. It fixes the position of the end caps 93, 94 with respect to the paper element 20, and this relative positioning carries through to the finished product.

Secondly, the pre-cure stops flow movement of uncured plastisol within the end caps, ensuring good end seals around the filter element. This increases efficiency and reduces scrap.

Third, the short duration of the pre-cure allows for increased productivity and higher filter production volumes in a given time period.

Horizontal-to-Vertical Rotation and Transfer Mechanism

After the pre-cure is completed, the gripper assembly 30 carries the pre-cured filter cartridge assembly down to a dropoff point, where the gripper assembly is opened to drop the filter into a transfer mechanism, for transferring the filter to a cure line.

Upon completion of the pre-cure, the individual gripper assembly 30 carries the filter element down to a drop-off station 100, shown in FIG. 8, where the gripper assembly 30 is opened to drop the workpiece. This is accomplished by the transport conveyor 33 moving the gripper assembly 30 past a stationary cam 85, which is attached to a plate 87, as shown in phantom in FIG. 8. As the gripper assembly 30 moves past the stationary cam 85, the stationary cam presses on the cam follower bearing 88 of the gripper assembly 30. This pressure moves the outer cage 52 inwardly towards the base plate of the inner cage, which presses the crossmember 78 so as to compress the internal spring 48 of the assembly. At the same time, the inward pressure on the outer cage 52 moves the cam follower bearings 62, 63 on the hinge portions inwardly with respect to the inner cage 46, while the pivot pin is held fixed in the inner cage. This forces the jaws 32, 34 open, releasing the filter cartridge 17 therefrom.

Figure 15:
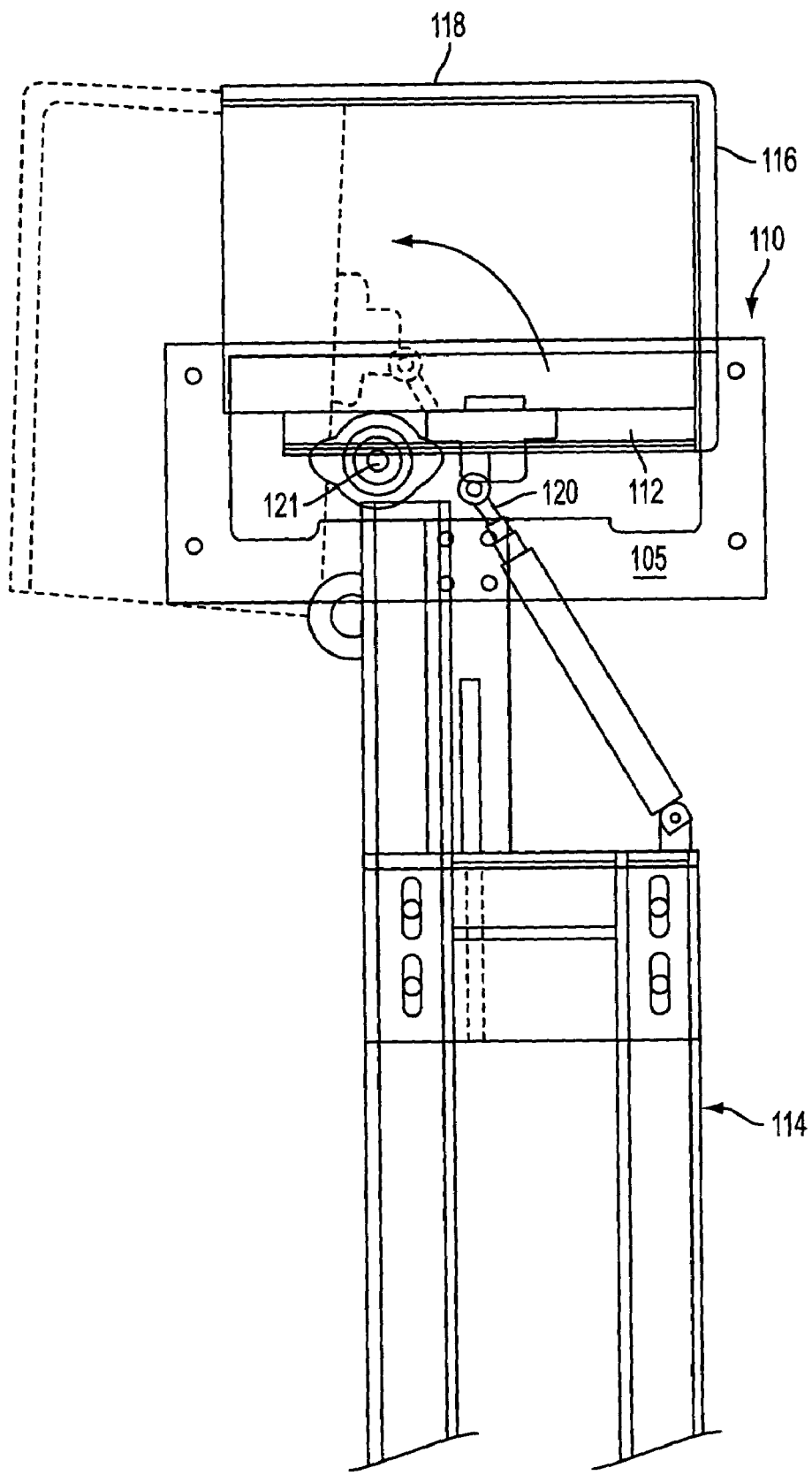
FIG. 15 is a side plan view of the unloading station of FIGS. 8-9.
Figure 16:
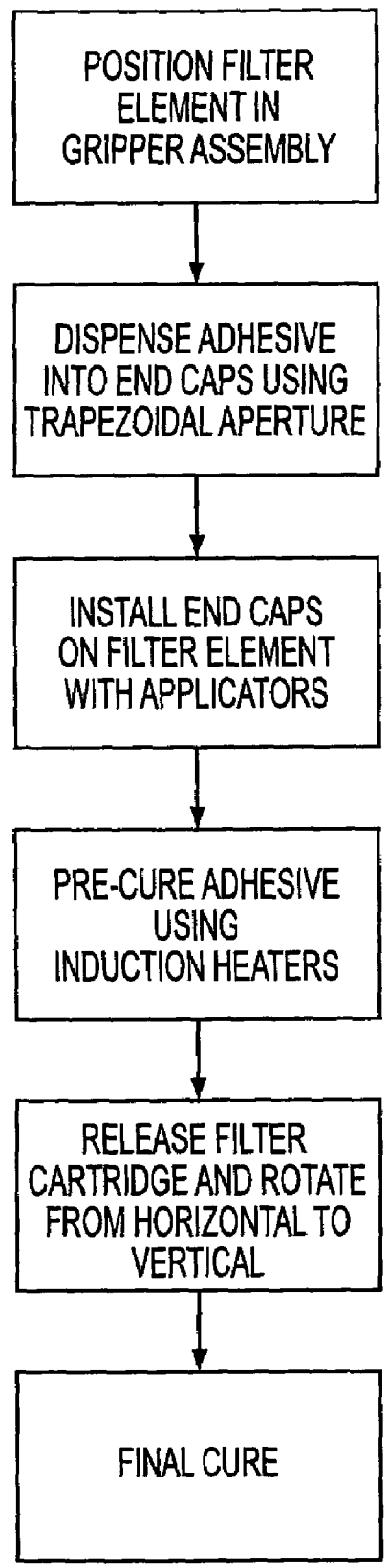
FIG. 16 is a series of method steps in a method of making a filter cartridge according to the present invention.

When the jaws 32, 34 of the gripper assembly open, the filter cartridge 17 is dropped into a shuttle member 102. The shuttle member has two opposed Y-shaped cradles 104, 106, which are each pivotally attached to opposite ends of a yoke 105. When activated by a motor or other driving means, the Y-shaped cradles 104, 106 pivot sideways together, in coordinated fashion, to transfer the filter cartridge 17 into a covered tray 110. The covered tray 110 is pivotally movable through a 90-degree arc, from a horizontal orientation, shown in solid lines, to a vertical orientation thereof, shown in phantom in FIG. 15. Although the covered tray is movable in this way, for purposes of convenience, it will be initially described in the horizontal orientation thereof shown in FIG. 8, with the understanding that it may be moved from that orientation.

The covered tray 110 includes a base tray portion 112, having a substantially V-shaped cross-section, and with a slot formed in the center thereof where the sides of the base tray portion come together. The slot extends about half the length of the base tray portion 112. A first end of he base tray portion 112 is pivotally attached to a fixed support frame 114 via a pivot connection 121, to allow for pivotal movement of the covered tray relative to the support frame. A second end of the base member carries an integrally attached backstop 116 of the covered tray, which extends upwardly from the base tray, as shown. At the top of the backstop 116, a cover plate 118 extends outwardly therefrom from the backstop 116 above the base tray portion 112, to provide reinforcing support to the filter cartridge 17, as it is rotated from a vertical orientation to a horizontal orientation thereof.

An extendable piston member 120 extends between the fixed support frame 114 and the underside of the base tray portion 112, where the piston member is attached with a pivotally movable connection. It will be understood that when the piston member 120 is extended, it forces the covered tray 110 to rotate 90 degrees around the pivoting connection 121, to the position shown in phantom in FIG. 15. This allows the filter cartridge 17 to fall out of the covered tray, in a vertical orientation thereof, on to a conveyor belt which conveys the cartridge to a final cure oven, where the adhesive is baked to permanently fix the end caps 93, 94 in place on the filter element 20.

Although the present invention has been described herein with respect to a preferred embodiment thereof, the foregoing description is intended to be illustrative, and not restrictive. Those skilled in the art will realize that many modifications of the preferred embodiment could be made which would be operable. All such modifications which are within the scope of the claims are intended to be within the scope and spirit of the present invention.

Having, thus, described the invention, what is claimed is:

1. A method of applying one or more end caps to a filter element, the filter element having a first end and a second end, the method comprising:
   supporting the filter element at least at a central portion thereof;
   grasping a first end cap with a first clamping device associated with a first end cap application apparatus;
   positioning the filter element adjacent the first end cap application apparatus; and
   pivotally moving the first clamping device around a first pivot connection from a first position toward a second position to urge the first end cap against the first end of the filter element.

2. The method of claim 1, further comprising:
   grasping a second end cap with a second clamping device associated with a second end cap application apparatus;
   positioning the filter element adjacent the second end cap application apparatus; and
   pivotally moving the second clamping device around a second pivot connection from a third position toward a fourth position to urge the second end cap against the second end of the filter element.

3. The method of claim 2, wherein the first and second clamping device are pivoted simultaneously to urge the first and second end caps, respectively, against the filter element.

4. The method of claim 1, wherein the first position comprises a substantially horizontal position and the second position comprises a substantially vertical position.

5. The method of claim 1, wherein the step of grasping the first end cap with the first clamping device, comprises:
   moving a plurality of arcuate segments on the first clamping device toward the first end cap to contact the first end cap.

6. The method of claim 1, further comprising applying an adhesive to the first end cap.

7. An apparatus for applying one or more end caps to a filter element, the filter element having a first end and a second end, comprising:
   a first means for supporting the filter element at least at a central portion thereof;
   a second means for holding a first end cap;
   a third means for positioning the filter element adjacent the second means; and
   a fourth means for pivotally moving the second means around a first pivot connection from a first position toward a second position to urge the first end cap against the first end of the filter element.

8. The apparatus of claim 7, further comprising:
   a fifth means for holding a second end cap;
   a sixth means for positioning the filter element adjacent the fifth means; and
   a seventh means for pivotally moving the fifth means around a second pivot connection from a first position toward a second position to urge the second end cap against the second end of the filter element.

9. The apparatus of claim 7, wherein the second and fifth means are pivoted simultaneously to urge the first and second end caps, respectively, against the filter element.

10. The apparatus of claim 7, wherein the second means comprises a plurality of arcuate segments configured to move toward the first end cap to contact the first end cap.

11. The apparatus of claim 7, further comprising a fifth means for applying an adhesive to the first end cap.

12. The apparatus of claim 7, wherein the first position comprises a substantially horizontal position and the second position comprises a substantially vertical position.

13. An apparatus for applying one or more end caps to a filter element, the filter element having a first end and a second end, comprising:
   a first device configured to support the filter element at least at a central portion thereof;
   a second device configured to hold a first end cap;
   a third device configured to position the filter element adjacent the second device; and
   a fourth device configured to pivotally move the second device around a first pivot connection from a first position toward a second position to urge the first end cap against the first end of the filter element.

14. The apparatus of claim 13, further comprising:
   a fifth device configured to hold a second end cap;
   a sixth device configured to position the filter element adjacent the fifth device; and
   a seventh device configured to pivotally move the fifth device around a second pivot connection from a third position toward a fourth position to urge the second end cap against the second end of the filter element.

15. The apparatus of claim 13, wherein the second and fifth devices are pivoted simultaneously to urge the first and second end caps, respectively, against the filter element.

16. The apparatus of claim 13, wherein the second device comprises a plurality of arcuate segments configured to move toward the first end cap to contact the first end cap.

17. The apparatus of claim 13, further comprising a fifth device configured to apply an adhesive to the first end cap.

18. The apparatus of claim 13, wherein the first position comprises a substantially horizontal position and the second position comprises a substantially vertical position.

* * * * *